United States Patent
Hayashi et al.

(10) Patent No.: US 6,426,809 B1
(45) Date of Patent: Jul. 30, 2002

(54) IMAGE TRANSMITTING SYSTEM AND IMAGE TRANSMITTING METHOD

(75) Inventors: Kanako Hayashi; Masayuki Hisatake; Shinichi Saito; Kunikazu Ueno; Manabu Ushikubo, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/182,231

(22) Filed: Oct. 30, 1998

(30) Foreign Application Priority Data

Nov. 28, 1997 (JP) .............................. 9-327449

(51) Int. Cl.$^7$ ................................ H04N 1/40
(52) U.S. Cl. .................. 358/529; 382/173; 382/164
(58) Field of Search ................. 358/529, 530, 358/434, 501, 505, 515, 447, 450, 538, 537, 474; 382/164, 162, 165, 302, 173

(56) References Cited

U.S. PATENT DOCUMENTS

| | | | | |
|---|---|---|---|---|
| 5,287,204 A | * | 2/1994 | Koizumi et al. | 358/538 |
| 5,349,450 A | * | 9/1994 | Yoshioka et al. | 358/500 |
| 5,357,354 A | * | 10/1994 | Matsunawa et al. | 358/530 |
| 5,361,143 A | * | 11/1994 | Nakayama et al. | 358/500 |
| 5,363,219 A | * | 11/1994 | Yoshida | 358/539 |
| 5,485,283 A | * | 1/1996 | Kaneko | 358/518 |
| 5,513,007 A | * | 4/1996 | Ito et al. | 358/296 |
| 5,557,430 A | * | 9/1996 | Isemura et al. | 358/501 |
| 5,581,374 A | * | 12/1996 | Shoji | 358/500 |
| 5,581,667 A | * | 12/1996 | Bloomberg | 395/109 |
| 5,638,192 A | * | 6/1997 | Yoshida | 358/530 |
| 5,717,506 A | * | 2/1998 | Yamamoto et al. | 358/523 |
| 5,719,686 A | * | 2/1998 | Sakamoto et al. | 358/444 |
| 5,724,440 A | * | 3/1998 | Funada et al. | 382/162 |
| 5,751,921 A | * | 5/1998 | Fujimoto | 395/109 |
| 5,761,339 A | * | 6/1998 | Ikeshoji et al. | 382/176 |
| 5,774,654 A | * | 6/1998 | Maki | 395/200.3 |
| 5,786,906 A | * | 7/1998 | Shishizuka | 358/500 |
| 5,801,846 A | * | 9/1998 | Nobuta | 358/468 |
| 5,848,185 A | * | 12/1998 | Koga et al. | 382/173 |
| 5,861,960 A | * | 1/1999 | Suzuki et al. | 358/432 |
| 5,914,755 A | * | 6/1999 | Ito et al. | 348/552 |
| 6,008,913 A | * | 12/1999 | Yoshida | 358/529 |
| 6,157,736 A | * | 12/2000 | JodoIn et al. | 382/173 |
| 6,226,397 B1 | * | 5/2001 | Yamagata et al. | 382/162 |

FOREIGN PATENT DOCUMENTS

| | | |
|---|---|---|
| JP | 1-108861 | 4/1989 |
| JP | 4-887750 | 3/1992 |
| JP | 6-178122 | 6/1994 |
| JP | A-6-292018 | 10/1994 |
| JP | 06-292018 | * 10/1994 |

OTHER PUBLICATIONS

Concise Statement of Relevancy Between Invention and Materials (English Language).
English language Abstracts for Japanese Publications 1–108861, 4–887750 and 6–178122.

* cited by examiner

*Primary Examiner*—Edward Coles
*Assistant Examiner*—Tia Carter
(74) *Attorney, Agent, or Firm*—Oliff & Berridge, PLC

(57) ABSTRACT

Input image information undergoes color conversion processing in a color conversion section 1, then is separated into first piece of image data, second piece of image data, and selection data in a multilayer data processing section 2 and transmission data in the multilayer data format is output. On the other hand, a 1-layer data processing section 3 prepares transmission data in the normal 1-layer data format from the image information. A color determination section 4 determines whether the input image information is a color or monochrome image. If the image information is determined a color image, a selection section 6 selects the transmission data in the multilayer data format; if the image information is determined a monochrome image, the selection section 6 selects the transmission data in the 1-layer data format. Then, it transmits the selected transmission data through a transmission section 7.

20 Claims, 25 Drawing Sheets

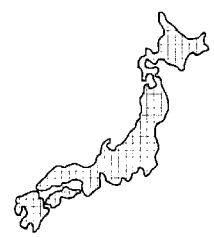
FIG. 5A
IM1
JAPAN
FIG. 5B
SELECTION DATA
JAPAN
FIG. 5C
IM2
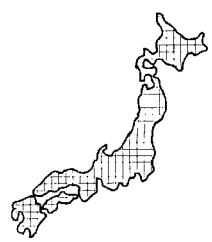
FIG. 5D

|   | MODE 0 | MODE 1 | MODE 2 | MEANING | TRANSMISSION DATA |
|---|---|---|---|---|---|
| ① | 0 | 0 | 0 | BLANK PAPER WITH NO INFORMATION | NONE |
| ② | 0 | 0 | 1 | SIGNAL-COLOR TEXT ORIGINAL | SEL |
| ③ | 0 | 1 | 0 | PHOTO IMAGE | IM2 |
| ④ | 0 | 1 | 1 | PHOTO WITH SINGLE-COLOR CAPTION | SEL + IM2 |
| ⑤ | 1 | 0 | 0 | BLANK PAPER WITH NO INFORMATION (WITH NOISE) | NONE |
| ⑥ | 1 | 0 | 1 | COLOR TEXT ORIGINAL | SEL + IM1 |
| ⑦ | 1 | 1 | 0 | PHOTO IMAGE (WITH NOISE) | IM2 |
| ⑧ | 1 | 1 | 1 | ORIGINAL WITH COLOR TEXT AND PHOTO MIXED | SEL + IM1 + IM2 |

FIG. 9

FIG. 10A
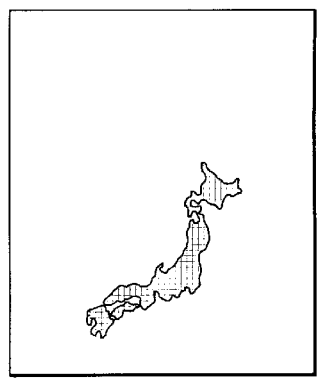
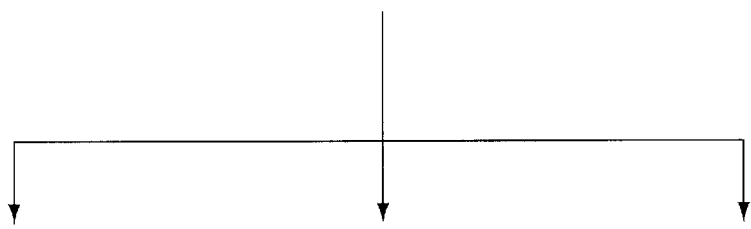
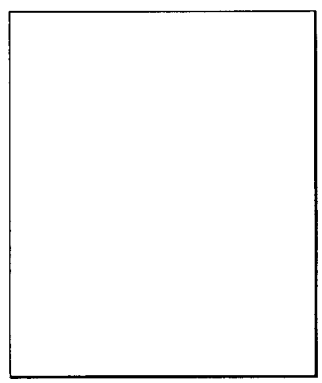
FIG. 10B
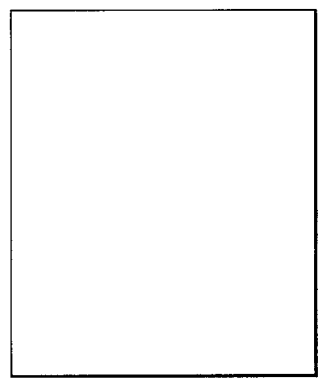
FIG. 10C
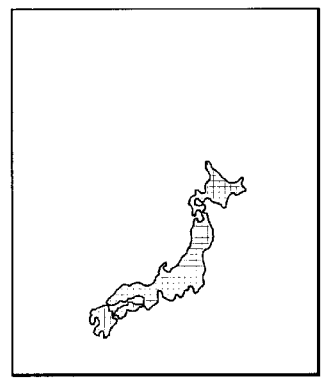
FIG. 10D
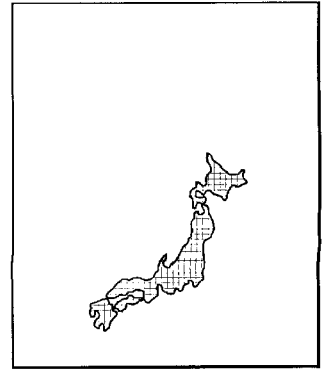
FIG. 10E

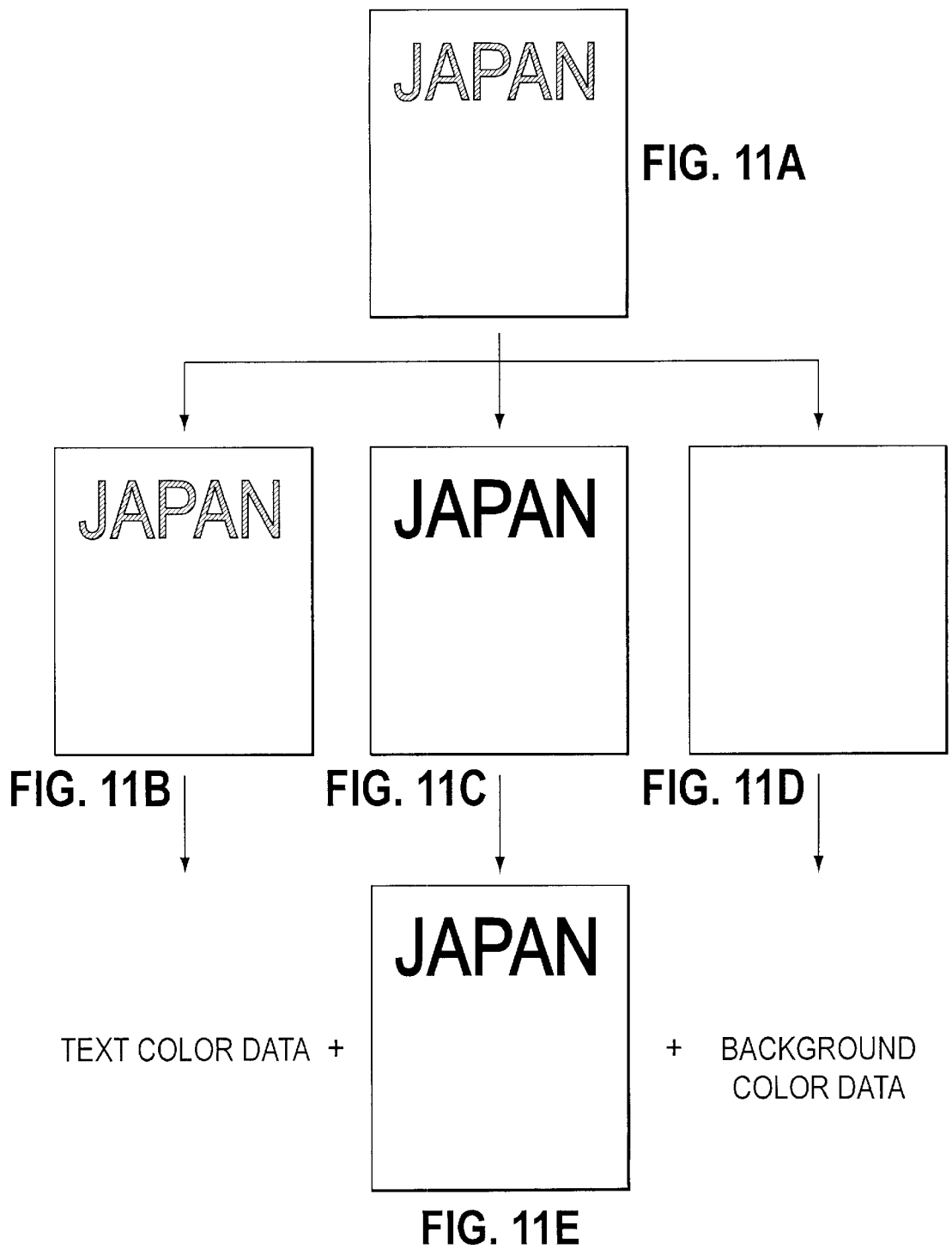

\+ BACKGROUND COLOR DATA

FIG. 13A
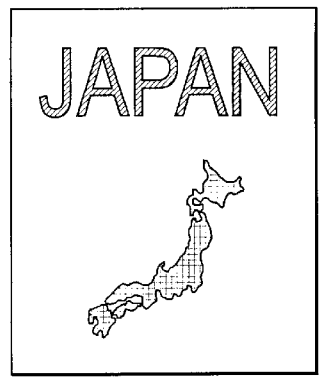
FIG. 13B  FIG. 13C  FIG. 13D
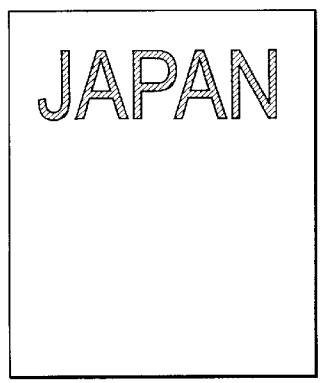 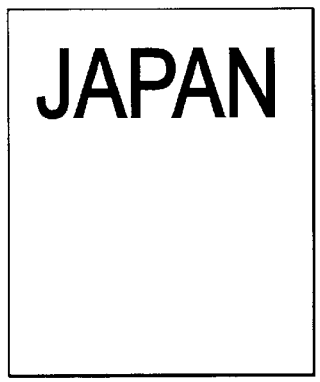 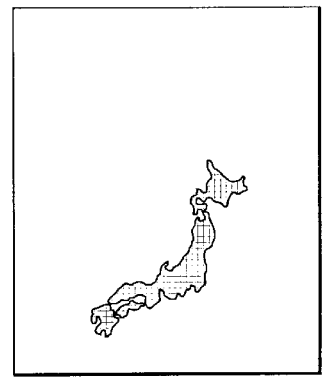
TEXT COLOR DATA  +    +  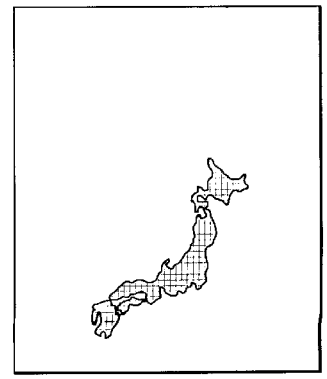
FIG. 13E  FIG. 13F FIG. 14A
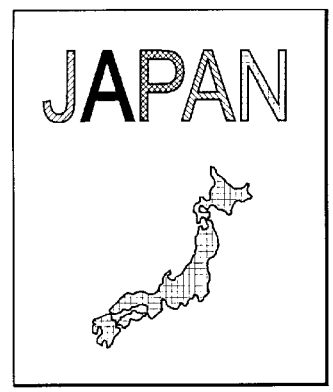
FIG. 14B 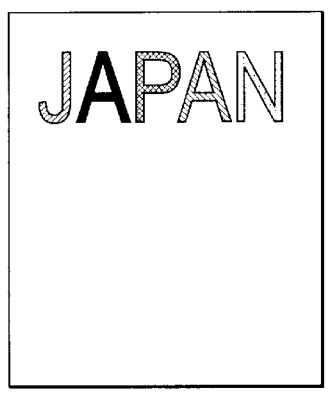  FIG. 14C 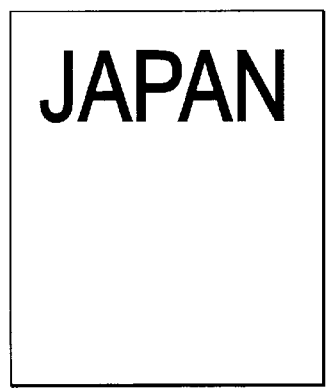  FIG. 14D 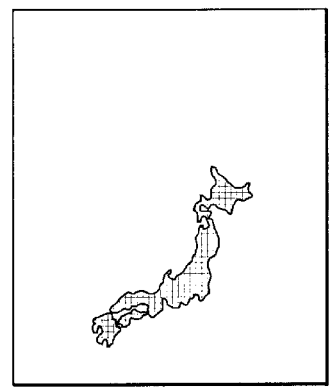
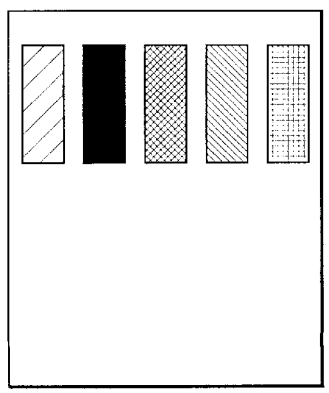  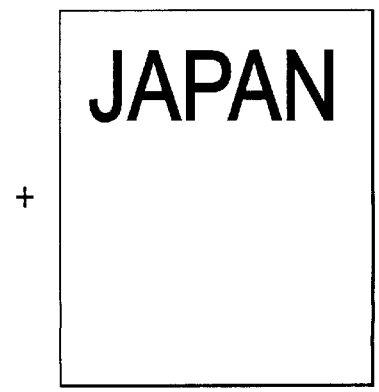  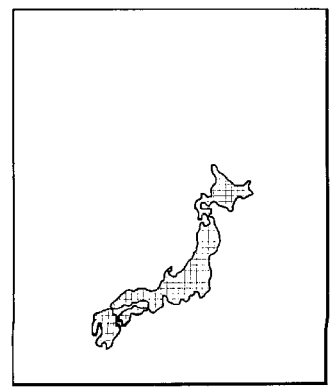 
FIG. 14E    FIG. 14F    FIG. 14G

IMAGE TRANSMITTING SYSTEM AND IMAGE TRANSMITTING METHOD

BACKGROUND OF THE INVENTION

This invention relates to an image transmitting system and an image transmitting method for transmitting image information over a transmission line such as a LAN (local area network) line or a public line. Further, the present invention also relates to color facsimile machines, or to transmission/reception of images of the Internet.

To transmit a color image, JPEG coding is often used if the original is a picture, a photo, etc. In the JPEG coding, first, an input image is divided into blocks, then orthogonal transformation is performed for each block. Quantization processing is performed for the resultant orthogonal transformation output and the provided quantization output is coded, compressed, and transmitted. However, the following problem is pointed out for the technique: If the technique is applied to text or a line drawing, degradation of mosquito noise, etc., is easily produced.

As a method for solving this problem, the Unexamined Japanese Patent Application Publication No. Hei 6-292018 proposes a method wherein an orthogonal transformation coding system is provided with new text block detection means and the quantization width for a block containing a large quantity of edge components, such as a text block, is made finer than that for any other block such as a picture or photo portion, thereby minimizing a quantization error of the block containing text and improving the image quality of text and line drawings.

To transmit a color multivalued image, data compression processing can be performed using a technique of orthogonal transformation, etc., as described above. However, generally, transmitted images often include monochrome document images only with black characters as well as color multivalued images. Compressing such monochrome images using a technique of orthogonal transformation, etc., like color multivalued images leads to an increase in the data amount and results in a rise in communication costs.

In recent years, an image output system that can output higher-definition color text and line drawing (multivalued) images has been developed. Accordingly, the data amount of transferred image information is larger than ever. On the other hand, considering the visual characteristics of human beings, higher resolution is a desirable trend for images with edge portions to be represented finely such as text and line drawings. However, if an image attaching importance to gradation reproducibility such as a picture or a photo is put into high resolution, an increase in the time required for image processing, the memory capacity, etc., is noticeable as compared with image reproducibility; a problem may be caused.

With conventional transmitting systems, as the image data resolution is raised to improve the text reproduction quality, the resolution of a picture or photo portion mixed in text or a line drawing is also raised; resultantly, the whole data amount becomes enormous, resulting in a rise in system and communication costs.

SUMMARY OF THE INVENTION

It is therefore an object of the invention to provide an image transmitting system and an image transmitting method which make it possible to transmit even a color image with a mixture of a picture, photo image and a text, line drawing image without degrading the image quality and with high efficiency and also are capable of transmitting monochrome images with high efficiency as before.

In the invention, whether or not input image information is a color or monochrome image or specification as to whether image information is a color or monochrome image is accepted from the user and if the image information is determined a color image or a color image is specified, the image information is transmitted in the multilayer data format consisting of a first piece of image data, a second piece of image data, and selection data for selecting either the first piece or the second piece of image data. Thus, for a color image, a picture portion, such as a photo, and a text, line drawing portion different in attribute can be processed and transmitted as different data layers, so that they can be transmitted with their respective optimum image quality and can also be compressed to their respective optimum data amounts for transmission with high efficiency.

To transmit the image information in the multilayer data format, the image information is transmitted in any one of a transmission format of transmitting only the selection data, a transmission format of transmitting the first piece of image data and the selection data, a transmission format of transmitting the second image data and the selection data, and a transmission format of transmitting the first piece of image data, the second piece of image data, and the selection data, for example, in response to the image attribute, whereby the data amount can be reduced in response to the image to be transmitted and the image can be transmitted with high efficiency.

If the input image information is determined a monochrome image or a monochrome image is specified, it is transmitted in the transmission format of transmitting only the selection data or transmission in the multilayer data format is inhibited and the image information is transmitted, for example, in the 1-layer data format consisting only of one data plane, whereby the transmission data amount of monochrome images can be drastically decreased as compared with that of color images and highly efficient transmission is enabled as before.

BRIEF DESCRIPTION OF THE DRAWINGS

In the accompanying drawings:

FIGS. 5A to 5D are schematic representation of a specific example of attribute separation in the first embodiment of the image transmitting system of the invention;

FIG. 9 is a schematic representation to show an example of the relationships among the mode signals output by the mode determination section and transmission data in the multilayer data format provided by a multiplexer in the first embodiment of the image transmitting system of the invention;

FIGS. 10A to 10E are schematic representation of a specific example of transmission data when input image information is a photo image only;

FIGS. 11A to 11E are schematic representation of a specific example of transmission data when input image information is a one-color text image only;

FIGS. 13A to 13F are schematic representation of a specific example of transmission data when the input image information is a mixture of a single-color text image and a photo image;

FIGS. 14A to 14G are schematic representation of a specific example of transmission data when the input image information is a mixture of a color text image and a photo image;

DETAILED DESCRIPTION OF THE PREFERRED EMBODIMENTS

Figure 1:
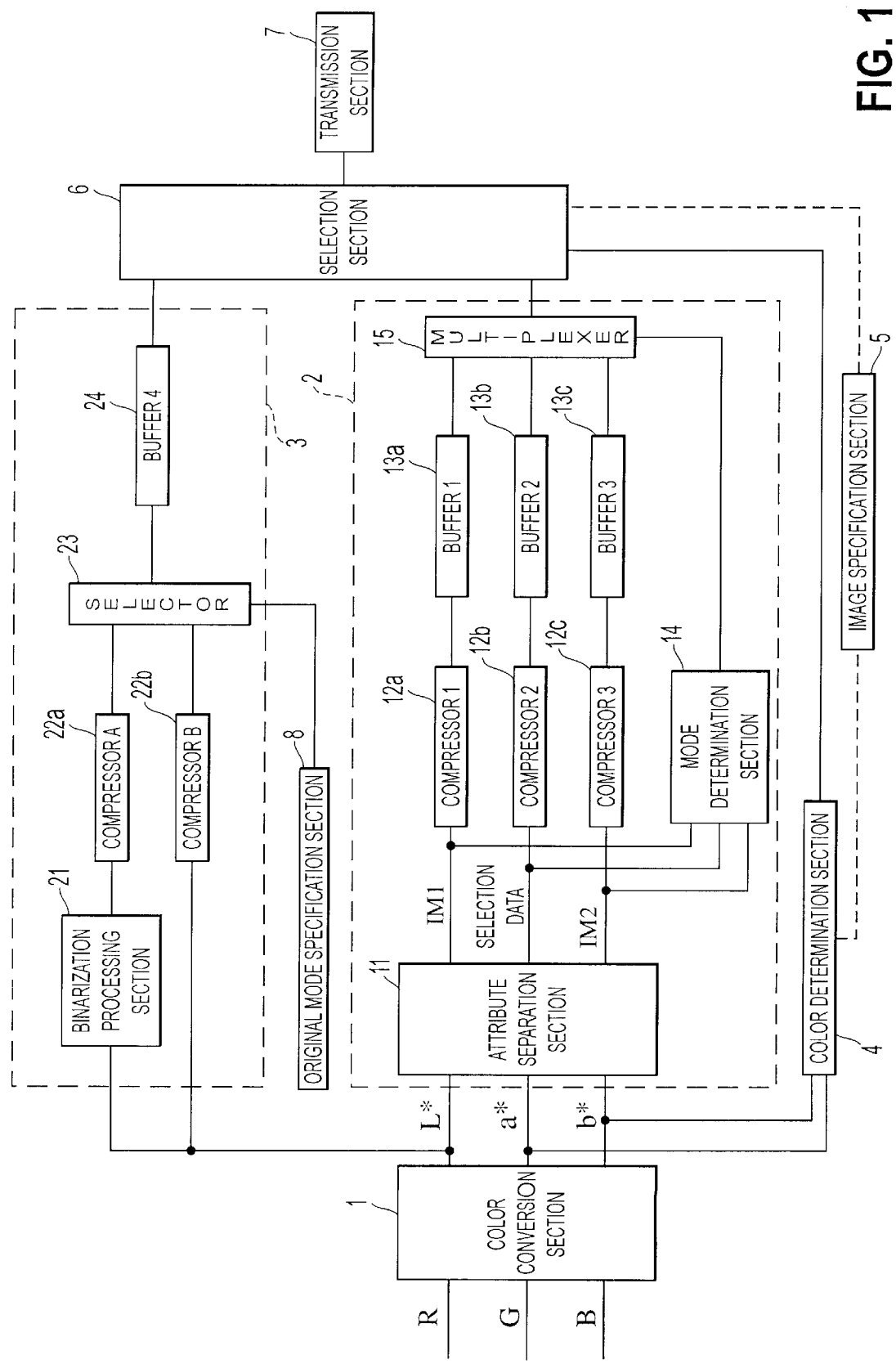
FIG. 1 is a block diagram to show a first embodiment of an image transmitting system of the invention.

FIG. 1 is a block diagram to show a first embodiment of an image transmitting system of the invention. In the figure, numeral 1 is a color conversion section, numeral 2 is a multilayer data processing section, numeral 3 is a 1-layer data processing section, numeral 4 is a color determination section, numeral 5 is an image specification section, numeral 6 is a selection section, numeral 7 is a transmission section, numeral 8 is an original mode specification section, numeral 11 is an attribute separation section, numerals 12a–12c are compressors, numerals 13a–13c are buffers, numeral 14 is a mode determination section, numeral 15 is a multiplexer, numeral 21 is a binarization section, numerals 22a and 22b are compressors, numeral 23 is a selector, and numeral 24 is a buffer. In the embodiment, the transmission section 7 is shared, namely, the multilayer data processing section 2 and the transmission section 7 make up multilayer data format transmission means and the 1-layer data processing section 3 and the transmission section 7 make up 1-layer data format transmission means.

The color conversion section 1 performs operation processing for mapping image information represented in a predetermined color space to another color space. Here, assume that input image information is image data of RGB color space with each color consisting of eight bits, which is mapped to CIE-L*a*b* equal color space, and that each component is output in eight bits. Of course, if color space conversion processing is not required, the color conversion section 1 may be omitted.

The multilayer data processing section 2 is made up of the attribute separation section 11, the compressors 12a–12c, the buffers 13a–13c, the mode determination section 14, the multiplexer 15, etc. The attribute separation section 11 detects local nature of input image information and separates the input image information into first piece of image data IM1 and second piece of image data IM2 based on the detected local nature. Further, it also outputs selection data for selecting either the first piece of image data IM1 or the second piece of image data IM2 as separated information. Here, assume as an example that if the selection data indicates '1,' it means that the input image information is separated into the first piece of image data IM1; if the selection data indicates '0,' it means that the input image information is separated into the second piece of image data IM2. In the first piece of image data IM1 and the second piece of image data IM2, image data of a predetermined value is inserted into image data corresponding to a position not allocated according to the selection data, and each of the first piece of image data IM1 and the second piece of image data IM2 forms an image data plane.

The compressors 12a–12c compress the first piece of image data IM1, the selection data, and the second piece of image data IM2 into which the input image information is separated by the attribute separation section 11 by compression coding techniques fitted to the data natures. For example, the selection data is binary data, thus a compression coding technique fitted to a binary image is applied to the compressor 12b. Specifically, MH/MR technique shown in ITU-T Recommendation T.4, MMR technique shown in T.6, JBIG technique shown in T.82/T.85, etc., can be used. Since the first piece of image data IM1 and the second piece of image data IM2 are multivalued image data, a compression coding technique fitted to a multivalued image is applied to the compressors 12a and 12c. Specifically, JPEG technique shown in T.81 may be used or the JBIG technique may be used to execute reversible compression. A universal coder of LZW technique, etc., may be used.

The buffers 13a–13c are memories for temporarily storing compressed code data provided by compressing the input image information in a predetermined size. The predetermined size can be set in page units, in units of a predetermined number of lines in the vertical scanning direction, or the like, for example. If the predetermined size is set in units of a predetermined number of lines in the vertical scanning direction, the memory capacity of the buffers 13a–13c can be lessened.

The mode determination section 14 analyses the first piece of image data IM1, the second piece of image data IM2, and the selection data output by the attribute separation section 11, determines whether or not each data plane contains significant information, and determines the transmission format mode in a multilayer data format of the input image information. The mode is described later in detail. In the embodiment, the transmission format mode in the multilayer data format is automatically determined, but the invention is not limited to it and the transmission format modes may be displayed on a control panel for the user to select one of the modes.

The multiplexer 15 appropriately selects the buffers 13a–13c storing compressed code data in accordance with output of the mode determination section 14 and forms transmission data in the multilayer data format.

The 1-layer data processing section 3 is made up of the binarization section 21, the compressors 22a and 22b, the selector 23, the buffer 24, etc.

The binarization processing section 21 performs predetermined binarization processing for lightness of the input image information (for example, L component in the CIE-L*a*b* equal color space). Various methods such as a simile binarization method optimum for text images and a dither method and an error diffusion method fitted to halftone images are known as binarization processing methods; any desired one method may be used or a number of methods may be used in combination.

The compressor 22a compresses the image information binarized by the binarization processing section 21 by a compression coding technique fitted to a binary image. As specific examples of the compression coding technique, MH/MR technique shown in ITU-T Recommendation T.4, MMR technique shown in T.6, JBIG technique shown in T.82/T.85, etc., can be used. The compressor 22b compresses lightness information of the input image information. Since the lightness information of the input image information is multivalued image data, a compression coding technique fitted to a multivalued image is applied to the compressors 12a and 12c. Specifically, JPEG technique shown in T.81 may be used or the JBIG technique may be used to execute reversible compression. A universal coder of LZW technique, etc., may be used.

The selector 23 selects either compressed data binarized by the binarization processing section 21 and coded by the compressor 22a or compressed data comprising the lightness information of the input image information coded by the compressor 22b in accordance with original mode specification information indicating the input original type specified on the original mode specification section 8. Specifically, if the input original is a photo image, the compressed code data of a multivalued image output by the compressor 22b is selected; otherwise, the compressed code data of a binary image output by the compressor 22a is selected.

The buffer 22 stores the compressed image data of the binary image or the multivalued image selected by the selector 23; it can store the data in page units or in units of a predetermined number of lines in the vertical scanning direction, for example. When the data is stored in units of a predetermined number of lines in the vertical scanning direction, the memory capacity of the buffer 24 can be lessened. The compressed code data stored in the buffer 24 is data processed without separating the input image information and thus can be regarded as transmission data in a 1-layer data format.

The color determination section 4 determines whether the input image information is color image data or monochrome image data. Here, image data of the CIE-L*a*b* equal color space is used for the determination, but image data of any color space, such as the RGB color space, may be used for the determination.

The image specification section 5 is a user interface for accepting user's specification as to whether the original is a color or monochrome image original. The user can specify whether the image information is to be transmitted as a color or monochrome image, for example, through a control panel (not shown) or the like. If the color determination section 4 determines that the input image information is monochrome image data, the user interface may be controlled so as to inhibit the user from specifying image information transmission as a color image.

The selection section 6 selects either transmission data in the multilayer data format output by the multiplexer 15 or transmission data in the 1-layer data format output by the buffer 24 in accordance with the determination result of the color determination section 4. Specifically, if the color determination section 4 determines that the input image data is a color image, the selection section 6 selects transmission data in the multilayer data format; if the color determination section 4 determines that the input image data is a monochrome image, the selection section 6 functions as inhibition means for inhibiting transmission of the transmission data in the multilayer data format, in which case it selects transmission data in the 1-layer data format output by the buffer 24. In addition, the specification information from the image specification section 5 is input to the selection section 6; the user's specification may also be considered for determining the image data transmission format. For example, if the user specifies transmission as a monochrome image although the image is a color image, the selection section 6 may be controlled so as to select the transmission data in the 1-layer data format output by the buffer 24.

The transmission section 7 transmits the transmission data selected by the selection section 6 to a public line, a network line, etc. Modem processing may be performed at transmitting to an analog line or processing for wrapping transmission image data in a format, such as TIFF, may be performed at the network line transmission time.

The original mode specification section 8 is a user interface for accepting input original type specification made by the user. The user can specify photo or any other type, for example, as the input original type, for example, through the control panel (not shown) or the like. The specified input original type is passed to the selector 23 as original mode specification information. Of course, the original type may be automatically determined in such a manner that an input data histogram is measured and the original is determined an original containing a text image if an extremely unbalanced distribution is found. If the color determination section 4 determines that the input image information is a color image and the user specifies transmission as a color image on the image specification section 5, the user interface may be controlled so as to inhibit the user from specifying the original mode.

Figure 2:
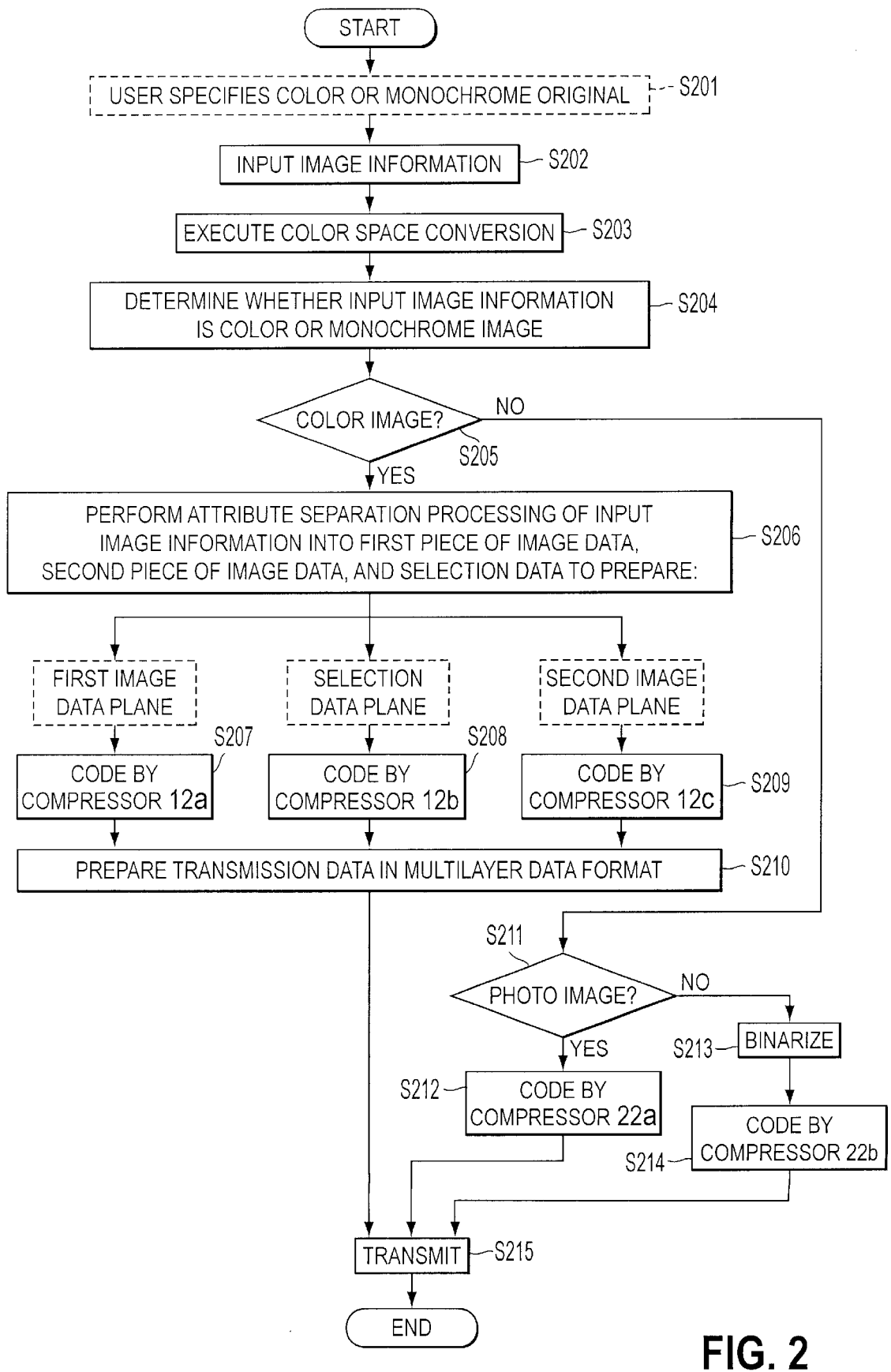
FIG. 2 is a flowchart to show an operation example in the first embodiment of the image transmitting system of the invention.

FIG. 2 is a flowchart to show an operation example in the first embodiment of the image transmitting system of the invention. In the figure, at step S201, to execute image transmission, the user specifies whether the original to be transmitted is color or monochrome through the image specification section 5 as required. At this time, the user may specify the original type, such as text, photo image, or both mixed, through the original mode specification section 8.

At step S202, image information is input by reading the original through an image input unit such as a scanner or is input over a line such as a network line from a computer, etc.

At step S203, to enable the receiving system party receiving the transmitted image data to reproduce a good color image from the image data, the color conversion section 1 converts the color space of the input image information into another color space, such as the CIE-L*a*b* equal color space. For example, if the color space of the input image information is the RGB color space depending on the light source of a scanner, the color conversion section 1 converts the RGB color space into the CIE-L*a*b* equal color space.

Next, at step S204, the color determination section 4 uses the image information of the CIE-L*a*b* equal color space, for example, provided by the color conversion section 1 to determine whether the input image information is a color or monochrome image. If it determines that the input image information is a color image, control goes from step S205 to step S206 at which the attribute separation section 11 separates the input image information into first piece of image data IM1, second piece of image data IM2, and selection data for selecting either the first or second piece of image data, whereby the input image information is disassembled into a first image data plane, a second image data plane, and a selection data plane.

At steps S207–S209, the first image data plane, the selection data plane, and the second image data plane are compressed by the compressors 12a–12c respectively. At step S208, the selection data plane, which is binary data, is coded by the compressor 12b using a compression coding technique suitable for binary image data, for example, MH/MR technique.

Another compression coding technique, such as MMR or JBIG, may be used to code the selection data plane. At steps S207 and S209, the first image data plane and the second image data plane, which are multivalued image data, are coded by the compressors 12a and 12c using a compression coding technique suitable for multivalued image data, for example, JPEG technique. If reproduction with higher accuracy is required, another method such as a reversible coding technique, for example, JBIG or LZW may be used.

At step S210, the mode determination section 14 checks to see if each of the data planes provided by the attribute separation section 11 contains significant data, selects the data plane to be transmitted based on the result, adds various pieces of information as required, and prepares transmission data in the multilayer data format according to the transmission format.

If the color determination section 4 determines that the input image information is a monochrome image at step S204, control goes to S211 and whether or not the original type is a photo original is determined. To do this, the original mode specification information specified by the user on the original mode specification section 8 can be used. Alternatively, whether or not the original type is a photo original may be automatically determined in the system. If the original type is a photo original, control goes to step S212 at which the input image information is coded by the compressor 22b using a compression coding technique fitted to multivalued image data, for example, JPEG technique or the like. If the original type is not a photo original, control goes to step S213 at which the input image information is binarized by the binarization processing section 21 and coded by the compressor 22a using a compression coding technique fitted to binary data, for example, MH, MMR, or the like.

Then, at step S215, the transmission section 7 uses the selected transmission data format to transmit the image data to a public line, a network line, etc.

Figure 3:
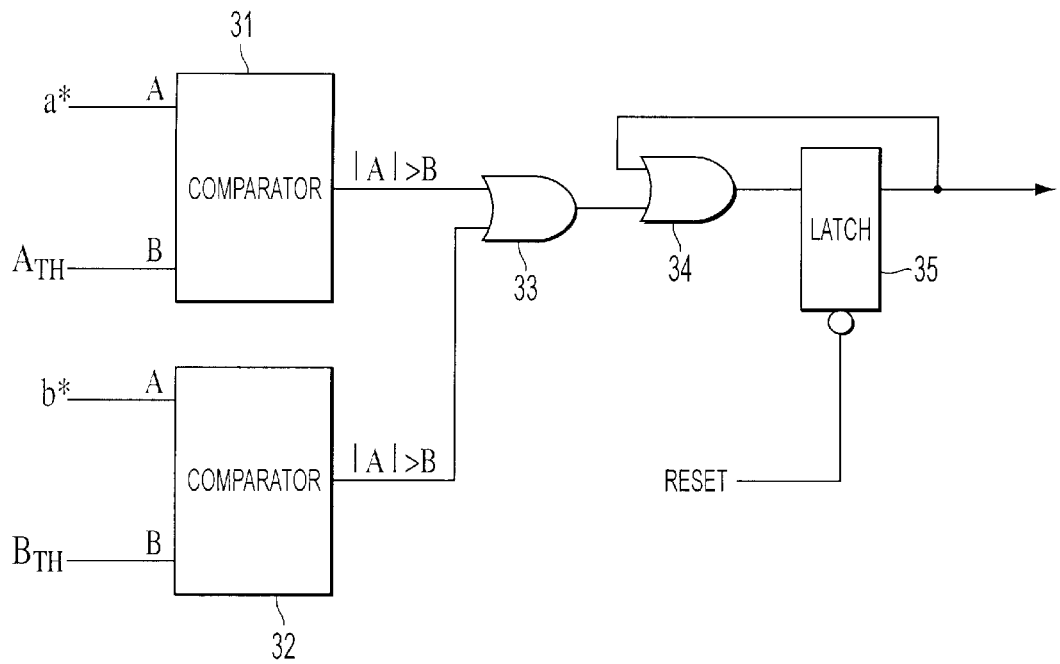
FIG. 3 is a block diagram to show an example of a color determination section in the first embodiment of the image transmitting system of the invention.

Next, some of the above-described members will be discussed in more detail. FIG. 3 is a block diagram to show an example of the color determination section in the first embodiment of the image transmitting system of the invention. In the figure, numerals 31 and 32 are comparators, numerals 33 and 34 are OR circuits, and numeral 35 is a latch circuit. When monochrome image data is observed in the CIE-L*a*b* equal color space, hue and chroma indicating color information little exist and the a* and b* components concentrate on small values. Therefore, the comparators 31 and 32 compare the absolute values of the a* and b* components output by the color conversion section 1 with predetermined threshold values ATH and BTH. If the absolution value of the a* (b*) component is equal to or greater than the threshold value ATH (BTH), the comparator 31 (32) outputs '1.' The OR circuits 33 and 34 and the latch circuit 35 detect either the comparator 31 or 32 outputting '1' and hold the output. That is, if a color portion with the a* or b* component greater than the threshold value is detected, the latch circuit 35 holds '1.'

A reset signal of the latch circuit 35 is input, for example, at the top every page or every predetermined number of vertical scanning lines, resetting the latch circuit 35 to 0. Therefore, if the latch circuit 35 outputs '0' at the termination of inputting image information on one page or on a predetermined number of vertical scanning lines, the image information on the page or area is determined a monochrome image. When color determination is made, the magnitude of the L* component is also referenced and the threshold values ATH and BTH to be compared with the a* and b* components in the greater-than, equal-to, less-than relation are changed in response to the magnitude of the L* component, whereby color image determination can also be made considering the paper color of the original read through the scanner.

The color determination result is sent to the selection section 6, which then selects transmission data in the multilayer data format if the input image information is determined a color image, or transmission data in the 1-layer data format if the input image information is determined a monochrome image, and transmits the selected transmission data through the transmission section 7.

Figure 4:
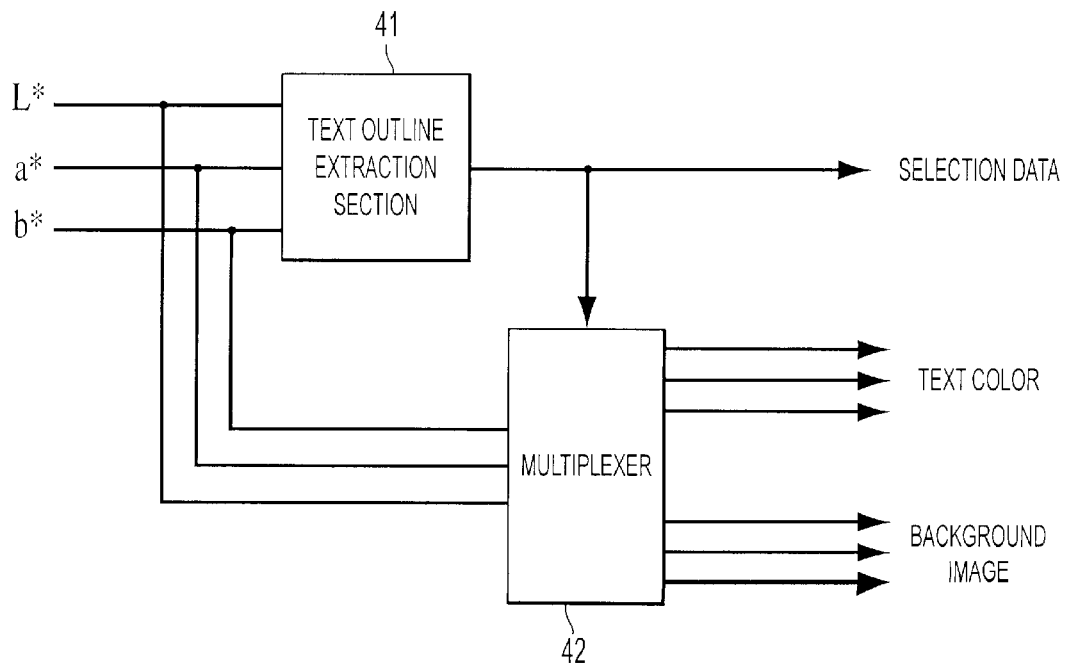
FIG. 4 is a block diagram to show an example of an attribute separation section in the first embodiment of the image transmitting system of the invention.

FIG. 4 is a block diagram to show an example of the attribute separation section in the first embodiment of the image transmitting system of the invention. In the figure, numeral 41 is a text outline extraction section and numeral 42 is a multiplexer. Here, an example of focusing attention on the text outline for executing attribute separation is given. Of course, attribute separation may be executed by any other method such as extracting of a text area in an aggregate of circumscribed rectangles of a text portion, for example.

The text outline extraction section 41 inputs image information of the CIE-L*a*b* equal color space output by the color conversion section 1, extracts the outline of text, a line drawing, etc., and outputs '1' for the extracted text, line drawing portion and '0' for the portion corresponding to the background other than the text or line drawing, for example.

The multiplexer 42 separates the input image information into first piece of image data IM1 and second piece of image data IM2 in response to the output value of the text outline extraction section 41. For example, if the text outline extraction section 41 outputs data '1,' the multiplexer 42 outputs the input image information as the first piece of image data IM1 and image data of predetermined value, for example, $L^*=a^*=b^*=0$ as the second piece of image data IM2. If the text outline extraction section 41 outputs data '0,' the multiplexer 42 outputs the input image information as the second piece of image data IM2 and image data of predetermined value, for example, $L^*=a^*=b^*=0$ as the first piece of image data Therefore, the text, line drawing portion is separated from the input image information into the first piece of image data IM1 and the background portion other than the text, line drawing portion is separated from the input image information into the second piece of image data IM2. In the description to follow, the first piece of image data IM1 will be referred to as text (character) color data and the second piece of image data IM2 as background image data in some cases. The output of the text outline extraction section 41 is data used for the multiplexer 42 to select either the first piece of image data IM1 or the second piece of image data IM2, and can be regarded as selection data. The selection data, the text color data, and the background image data output by the attribute separation section 11 become the same size in the horizontal and vertical scanning directions.

FIGS. 5A to 5D are schematic representation of a specific example of the attribute separation in the first embodiment of the image transmitting system of the invention. For example, assume that the input image information is a color image with a picture and text mixed as shown in FIG. 5A. In the image shown in FIG. 5A, character string JAPAN and a halftone Japanese map are drawn. The character string JAPAN is also drawn in different colors for each character. For convenience of illustration, different hatchings are used to show different colors.

The text outline extraction section 41 of the image separation section 11 extracts a text, line drawing portion, namely, the portion of the character string JAPAN from the image as shown in FIG. 5A. If '1' is output for the text, line drawing portion and '0' is output for any other portion, for example, as described above, the selection data as shown in FIG. 5C is provided. In FIG. 5C, the parts corresponding to '1' are shown in black.

The multiplexer 42 separates the image shown in FIG. 5A according to the selection data. It separates the image parts corresponding to selection data '1' as shown in FIG. 5B and the image parts corresponding to selection data '0' as shown in FIG. 5D. Thus, the color character string JAPAN portion in FIG. 5A is separated as the first piece of image data IM1 shown in FIG. 5B and the portion including the Japanese map other than the text, drawing line portion is separated as the second piece of image data IM2 shown in FIG. 5D.

Figure 6:
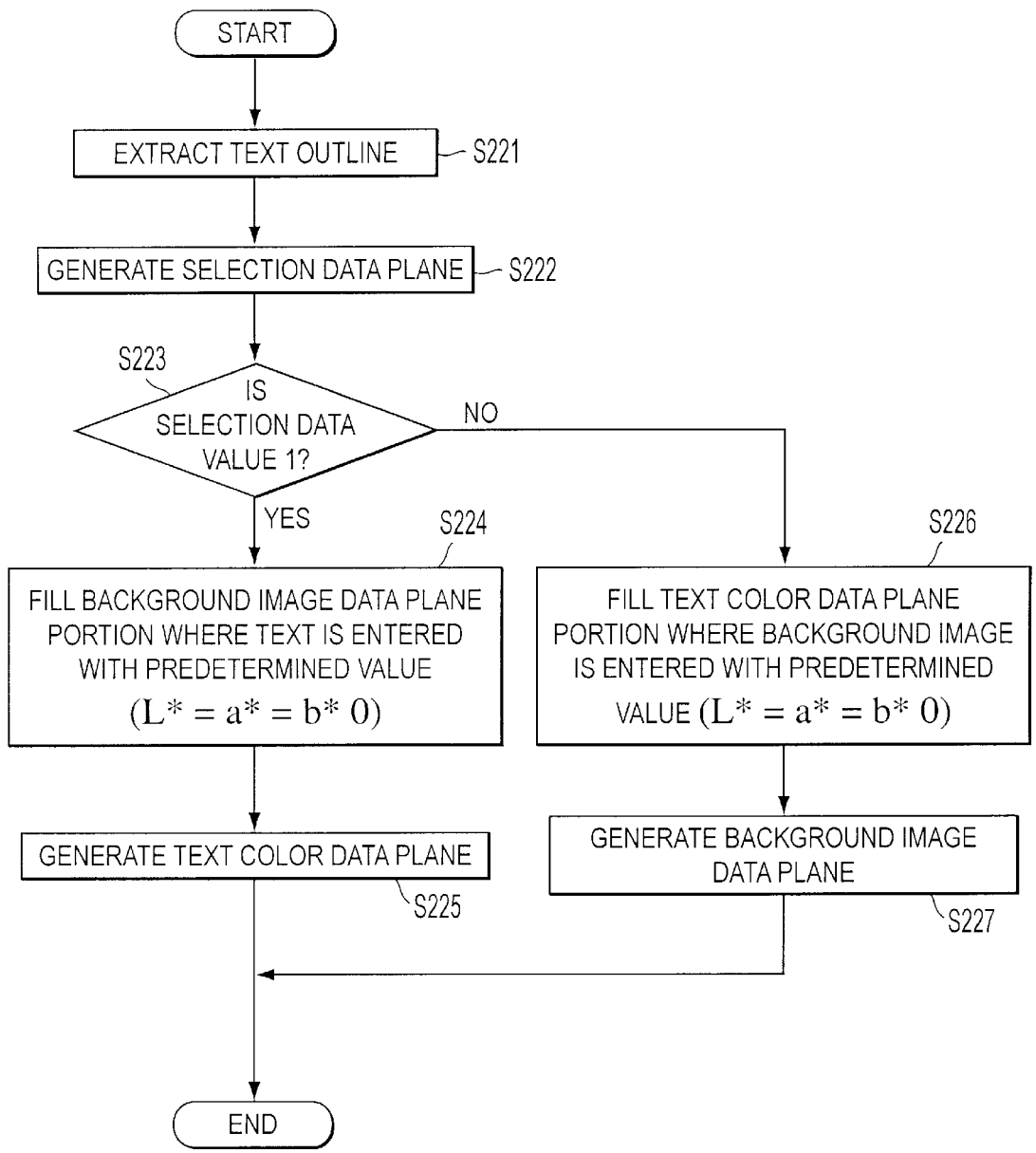
FIG. 6 is a flowchart to show an operation example of the attribute separation section in the first embodiment of the image transmitting system of the invention.

FIG. 6 is a flowchart to show an operation example of the attribute separation section in the first embodiment of the image transmitting system of the invention. In the figure, first at step S221, the text outline extraction section 41 extracts the outline of a text or line drawing portion in input image information. An example of the extraction method will be discussed later. At step S222, '1' is assigned to the text, line drawing portion extracted at step S221 and '0' is assigned to the portion corresponding to the background of the text, line drawing portion as selection data. The multiplexer 32 references the selection data at step S223 and as the portion corresponding to the selection data '1,' fills the background image data plane portion where text is entered with predetermined value (for example, $L^*=a^*=b^*=0$) at step S224, then generates a text color data plane at step S225. As the portion corresponding to the selection data '0,' the multiplexer 32 fills the text color data plane portion where background image is entered with predetermined value (for example, $L^*=a^*=b^*=0$) at step S226, then generates a background image data plane at step S227.

Figure 7:
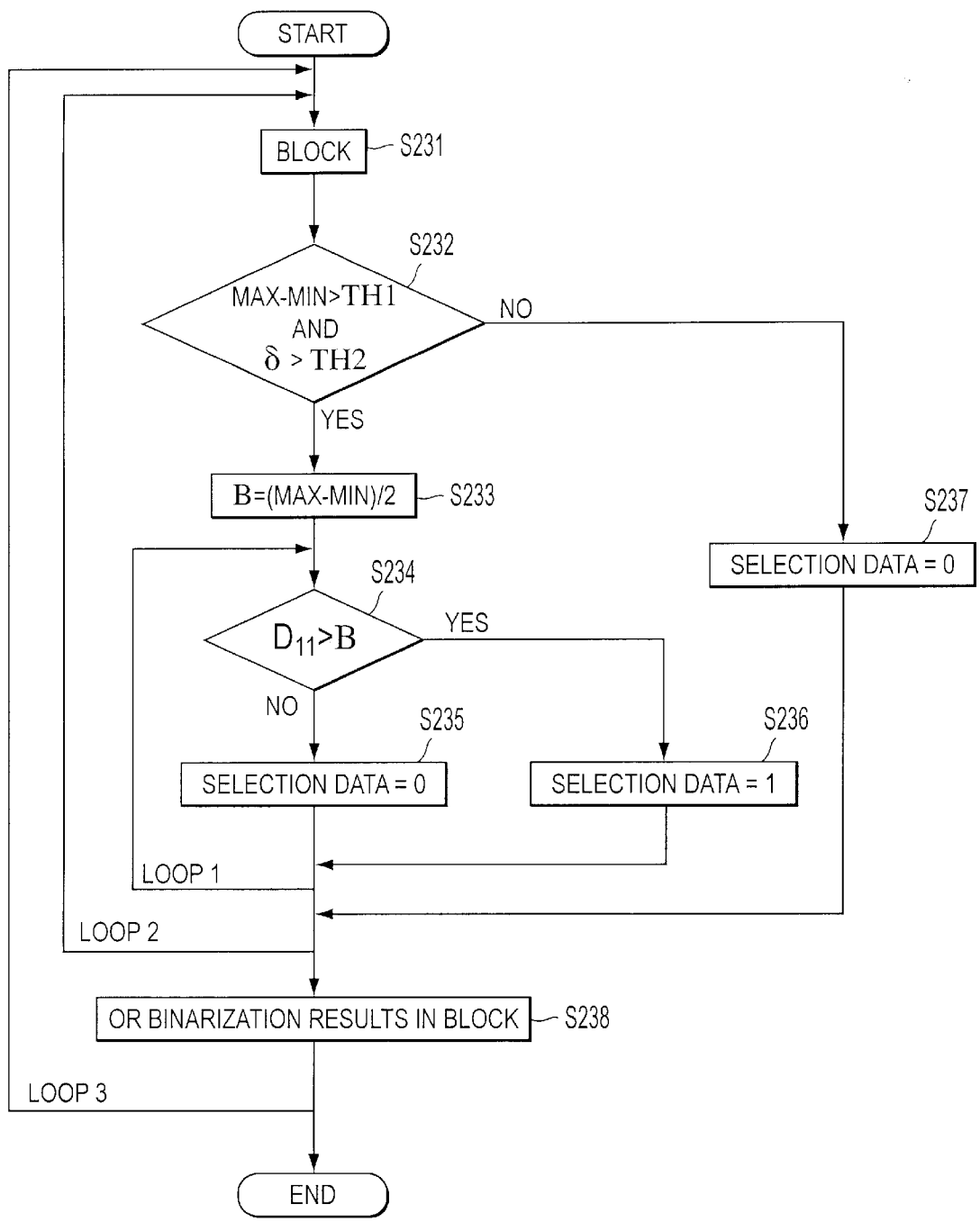
FIG. 7 is a flowchart to show an operation example of a text outline extraction section in the first embodiment of the image transmitting system of the invention.

FIG. 7 is a flowchart to show an operation example of the text outline extraction section in the first embodiment of the image transmitting system of the invention. In the figure, at step S231, the image data of the $L^*a^*b^*$ color space from which the outline of a text, line drawing portion is to be extracted is divided into blocks each of a predetermined size, such as 8×8 pixels, for each component ($L^*$ component, $a^*$ component, $b^*$ component), and a pixel value histogram in each block is found. Next, at step S232, the difference between the maximum and minimum pixel values in the block is found, then whether or not the difference is greater than a first predetermined threshold value TH1 is checked and whether or not dispersion value 8 is greater than a second predetermined threshold value TH2 is checked. If it is determined that the pixel value difference and the dispersion value are greater than the threshold values, the block is determined a text, line drawing block involving abrupt pixel value change, and control goes to step S233. If the block is not determined a text, line drawing, control goes to step S237 at which all selection data related to the block is set to '0' and control returns to step S231 along LOOP 2 to repeat similar processing for any other color component data in the block.

At step S233, the mean value of the maximum and minimum pixel values in the block is found as threshold value B involved in binarization processing in the block. At step S234, every pixel belonging to the block is compared with the threshold value B, then '1' is assigned to each pixel having a value greater than the threshold value B at step S236 and '0' is assigned to each pixel having a value smaller than the threshold value B at step S235. Then, control returns to step S234 along LOOP 1 and the process is repeated for 8×8 pixels. Further, on LOOP 2, the process is repeated for all color components of $L^*$, $a^*$, and $b^*$ in the block.

At the termination of color component processing in the block, at step S238, color component binarization results are ORed and selection data in the block is generated. Then, control returns to step S231 along LOOP 3 and the next block is processed. The processing sequence is repeated until all 1-page image data, for example, is processed.

The algorithm for extracting the outline of a text, line drawing portion is not limited to the determination algorithm by performing statistic processing of pixel values as described here. In addition, various methods can be applied including a method of finding a spatial frequency distribution of image data by performing orthogonal transformation processing, etc., and extracting the outline of a text, line drawing portion based on the result.

Figure 8:
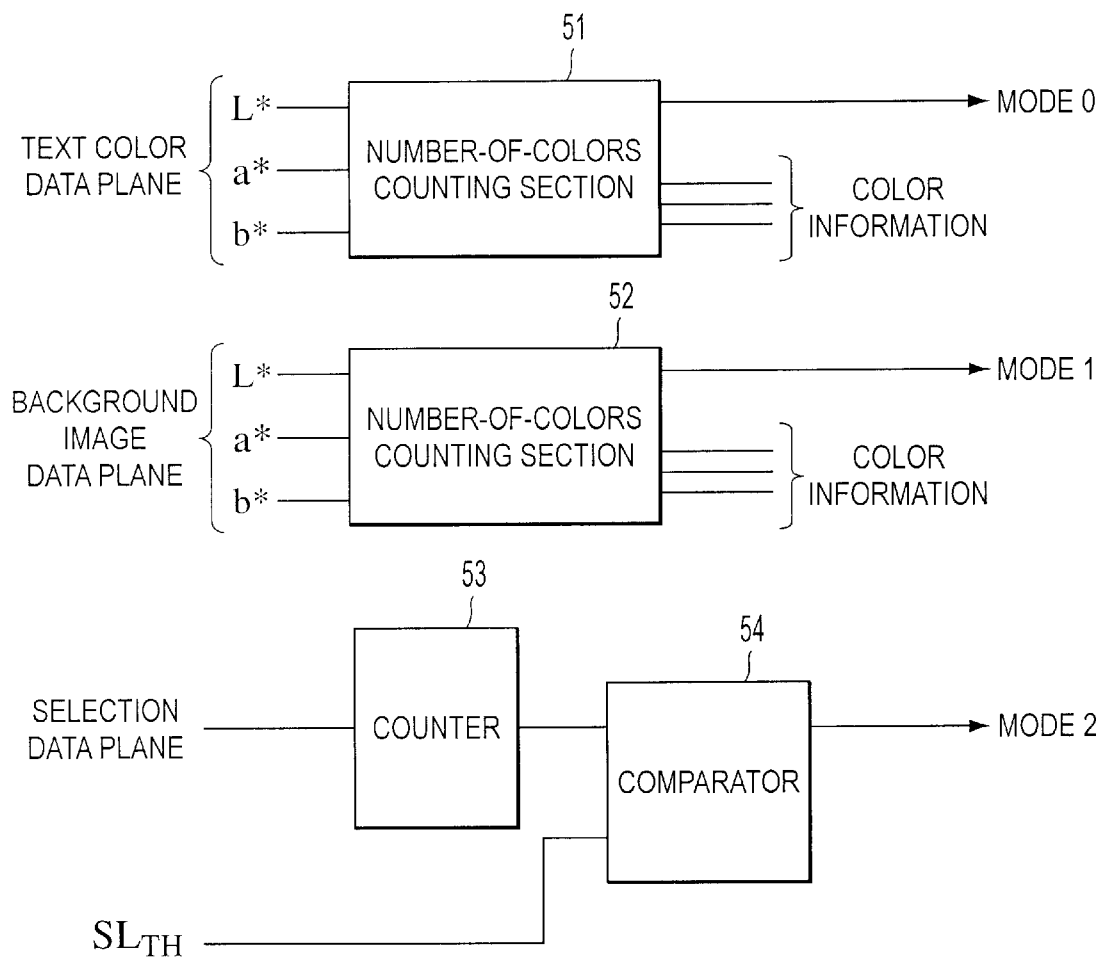
FIG. 8 is a block diagram to show an example of a mode determination section in the first embodiment of the image transmitting system of the invention.

FIG. 8 is a block diagram to show an example of the mode determination section in the first embodiment of the image transmitting system of the invention. In the figure, numerals 51 and 52 are number-of-colors counting section, numeral 53 is a counter, and numeral 54 is a comparator. The number-of-colors counting section 51 counts the number of colors contained in the text color data plane, namely, the number of combinations of the $L^*$, $a^*$, and $b^*$ components of input image data. Since image data of predetermined value is inserted into the pixel positions not selected as text color data according to the selection data as described above, it is advisable not to count the text color data matching the predetermined value as significant information. When the number of colors is two or more, a mode 0 signal output by the number-of-colors counting section 51 becomes '1' and the color information output at this time may be ignored. If the text color is the predetermined value only and the number-of-colors count result is 0, the color information output indicates predetermined value and the mode 0 signal becomes '0.' If the number-of-colors count result is 1, the color information output indicates image data of the L*a*b* color space of significant text color at the time and the mode 0 signal becomes '0.'

The number-of-colors counting section 52 counts the number of colors contained in the background image data plane. Image data of predetermined value is inserted into the pixel positions not selected as background image data according to the selection data; it is advisable not to count the background image data matching the predetermined value as significant information. When the number of colors is two or more, a mode 1 signal output by the number-of-colors counting section 52 becomes '1' and the color information output at this time may be ignored. If all the background image colors are the predetermined value and the number-of-colors count result is 0, the color information output indicates predetermined value and the mode 1 signal becomes '0.' If the number-of-colors count result is 1, the color information output indicates image data of the L*a*b* color space of significant background color at the time and the mode 1 signal becomes '0.'

The counter 53 counts the number of significant pixels contained in the selection data plane. If the image information input to the color conversion section 1 in FIG. 1 is a photo image not containing text or a line drawing, the image information converted into the CIE-L*a*b* color space by the color conversion section 1 is all assigned to the background image data plane by the image separation section 11. The selection data at this time is all '0.' Thus, if the input image information indicates strong photo image nature, most selection data becomes '0,' and the possibility that a pixel set to '1' is noise, such as garbage deposited on the photo, is high.

The comparator 54 compares the output of the counter 53 with a predetermined threshold value SLTH and if the threshold value SLTH is greater, outputs '0' indicating that the selection data plane does not contain significant information. In contrast, if the output of the counter 53 is greater than the threshold value SLTH, the comparator 54 outputs '1' indicating that the selection data plane is significant. The output of the comparator 54 is used as a mode 2 signal.

FIG. 9 is a schematic representation to show an example of the relationships among the mode signals output by the mode determination section and transmission data in the multilayer data format provided by the multiplexer in the first embodiment of the image transmitting system of the invention. If the selection data plane does not contain significant information and the mode 2 signal becomes '0,' it means that the input image information is all separated into background image data plane and it is estimated that the input image information is a photo original not containing text or a line drawing. Here, if the mode 1 signal indicates '0,' it means that the background image is determined to be in a single color and it is estimated that blank paper with no information is read as shown in (1) and (5) of FIG. 9. At this time, to suppress fruitless communication cost, it is desirable not to transmit the image data. If the mode signal indicates '1,' it is considered that the background image data plane contains significant information, thus the second piece of image data IM2 forming the background image data plane is selected as transmission data, as shown in (3) and (7) of FIG. 9. At this time, the selection data is assumed to be all '0' and the text image data plane does not contain significant information, thus need not be transmitted. For example, only the background image data plane with a photo image, etc., may be transmitted with additional information indicating that the text image data plane is not transmitted.

FIGS. 10A to 10E are schematic representation of a specific example of transmission data when the input image information is a photo image only. FIG. 10A shows an example of the input image information. In this example, a halftone Japanese map is drawn and no text exists. The attribute separation section 11 separates the image information shown in FIG. 10A into data planes, as described above. Since no text area exists, the selection data becomes all '0' as shown in FIG. 10C and the text color data plane also becomes all a predetermined value, as shown in FIG. 10B. Resultantly, the input image information is all separated into the background image data plane, as shown in FIG. 10D. The mode determination section 14 determines that only the background image data plane shown in FIG. 10D contains significant information, thus only the background image data plane is selected as transmission data, as shown in FIG. 10E.

If the selection data contains significant information and the mode 2 and 1 signals indicate '1' and '0' respectively, it is estimated that the input image information is an original consisting of text and a line drawing only. Further, if the mode 0 signal indicates '0' and the text color is determined a single color, it indicates that the text and line drawing in the image information are drawn only in one color. In this case, the data of the color in which the text and line drawing are drawn and the background color data are transmitted as additional information apart from transmission data, whereby it is made possible to transmit only the selection data (represented as SEL in FIG. 9) as transmission data, as shown in (2) of FIG. 9 (Table 1–(2)).

FIGS. 11A to 11E are schematic representation of a specific example of transmission data when the input image information is a one-color text image only. FIG. 11A shows an example of the input image information. In this example, character string JAPAN is drawn in one color with no picture portion. The attribute separation section 11 separates the image information shown in FIG. 11A into data planes, as described above. The selection data is set to '1' for the character string JAPAN portion and the selection data plane shown in FIG. 11C is provided. Since only the parts corresponding to the selection data '1' are separated into the text color data plane, colored character string JAPAN is separated as shown in FIG. 11B. The portion other than the character string JAPAN is separated into the background image data plane, but significant information other than the character string does not exist in the input image information, the background image data plane becomes a blank paper state as shown in FIG. 11D.

The mode determination section 14 determines FIGS. 11B to D. The mode 2 signal becomes '1' from the selection data shown in FIG. 11C and the mode 0 signal becomes '0' indicating single color from the text color data plane shown in FIG. 11B, then the text color is output. Further, the mode 1 signal becomes '0' indicating single color from the background image data plane shown in FIG. 11D, then the background color is output. Thus, only the selection data plane shown in FIG. 11E is selected as transmission data. The text color data and the background color data output by the mode determination section 14 may be added to the transmission data as additional information.

In the example, when the text color is black, a monochrome text image is applied, thus can also be transmitted in the multilayer data format. However, as in the example, to transmit an image in the multilayer data format, the text color data and the background color data are added and various pieces of data for formatting are added, thus the transmission data amount increases as compared with transmission in the 1-layer data format. Therefore, the image transmitting system is adapted to transmit monochrome images in the 1-layer data format, as described above.

Even if the mode 2 and 1 signals indicate '1' and '0' respectively and it is estimated that the input image information is an original consisting of text and a line drawing only as described above, if the mode 0 signal indicates '1,' it is estimated that the input image information is an original of a color text, line drawing image in two colors or more. At this time, the background color data may be transmitted to the receiving system party as additional information apart from transmission data and the image data of the two planes of text color data plane (IM1) and selection data plane (SEL) may be transmitted, as shown in (6) of FIG. 9.

Figure 12A:
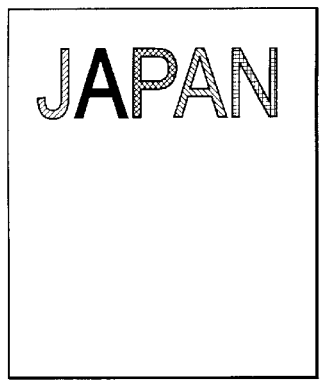
FIGS. 12A to 12F are schematic representation of a specific example of transmission data when the input image information is a color text image only.
Figure 12B:
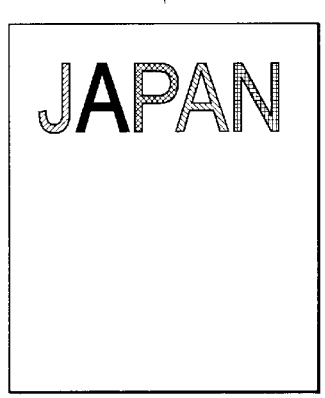
Figure 12C:
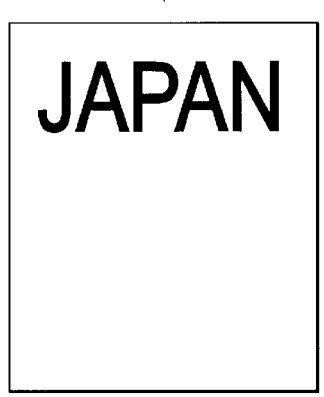
Figure 12D:
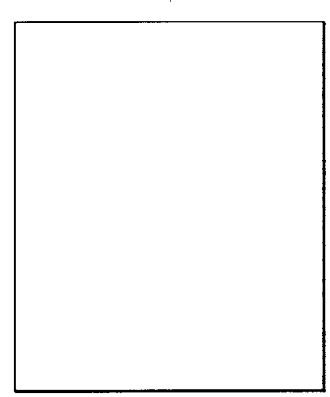

FIGS. 12A to 12F are schematic representation of a specific example of transmission data when the input image information is a color text image only. FIG. 12A shows an example of the input image information. In this example, the characters of character string JAPAN are drawn in different colors with no picture portion. The attribute separation section 11 separates the image information shown in FIG. 12A into data planes, as described above. The selection data is set to '1' for the character string JAPAN portion and the selection data plane shown in FIG. 12C is provided. Since only the parts corresponding to the selection data '1' are separated into the text color data plane, the color character string JAPAN is separated as shown in FIG. 12B. The portion other than the character string JAPAN is separated into the background image data plane, but significant information other than the character string does not exist in the input image information, the background image data plane becomes a blank paper state as shown in FIG. 12D.

Figure 12E:
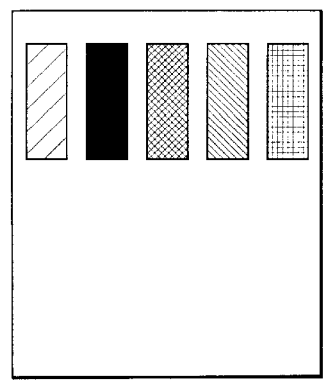
Figure 12F:
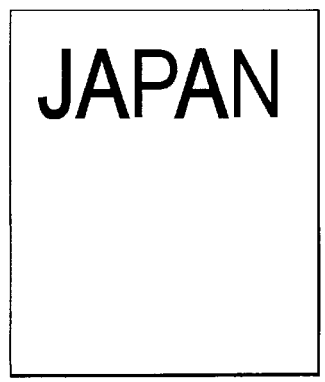

The mode determination section 14 determines FIGS. 12B to 12D. The mode 2 signal becomes '1' from the selection data shown in FIG. 12C and the mode 0 signal '1' indicating more than one color is output from the text color data plane shown in FIG. 12B. Further, the mode 1 signal '0' indicating single color is output from the background image data plane shown in FIG. 12D. Thus, the text color data plane shown in FIG. 12E and the selection data plane shown in FIG. 12F are selected as transmission data. The background color data output by the mode determination section 14 may be added to the transmission data as additional information. In FIG. 12E, the circumscribed rectangles of the characters are filled with color data of the characters, whereby the compressed data amount of the text color data plane is reduced.

If the mode 2 and 1 signals indicate both '1,' it is estimated that the input image information is an original with a photo image and a text or line drawing image mixed. If the mode 0 signal indicates '0' and the text color is determined single color, the text color data at the time may be transmitted to the receiving system party as additional information apart from transmission data and the image data of the two planes of background image data plane (IM2) and selection data plane (SEL) may be transmitted as transmission data, as shown in (4) of FIG. 9.

FIGS. 13A to 13F are schematic representation of a specific example of transmission data when the input image information is a mixture of a single-color text image and a photo image. FIG. 13A shows an example of the input image information. In this example, character string JAPAN is drawn in one color and a halftone Japanese map is drawn. The attribute separation section 11 separates the image information shown in FIG. 13A into data planes, as described above. The selection data is set to '1' for the character string JAPAN portion and the selection data plane shown in FIG. 13C is provided. Since only the parts corresponding to the selection data '1' are separated into the text color data plane, the character string JAPAN drawn in one color is separated as shown in FIG. 13B. The portion other than the character string JAPAN, for example, the halftone Japanese map portion is separated into the background image data plane as shown in FIG. 13D.

The mode determination section 14 determines FIGS. 13B to 13D. The mode 2 signal becomes '1' from the selection data shown in FIG. 13C and the mode 0 signal becomes '0' indicating single color from the text color data plane shown in FIG. 13B, then the data indicating the text color is output. Further, the mode 1 signal '1' indicating more than one color is output from the background image data plane shown in FIG. 13D. Thus, the selection data plane shown in FIG. 13E and the background image data plane shown in FIG. 13F are selected as transmission data. The text color data output by the mode determination section 14 may be added to the transmission data as additional information.

If the mode 2 and 1 signals indicate '1' and further the mode 0 signal also indicates '1,' it means that color text, line drawing, and photo images, etc., in two colors or more are mixed. At this time, the image data of all the three planes of background image data plane (IM2), text color data plane (IM1), and selection data plane (SEL) are be transmitted, as shown in (8) of FIG. 9.

FIGS. 14A to 14G are schematic representation of a specific example of transmission data when the input image information is a mixture of a color text image and a photo image. The example shown in FIG. 14 is the same as that shown in FIG. 5. The image information shown in FIG. 14A is separated as shown in FIGS. 14B to 14D. The mode determination section 14 determines FIGS. 14B to 14D and outputs the mode 0-2 signals which are all '1.' Thus, the three planes of the text color data plane, the selection data plane, and the background image data plane are all selected as transmission data, as shown in FIGS. 14E to 14G. Also in the example like that in FIG. 12, for the transmission data of the text color data plane shown in FIG. 14E, the circumscribed rectangles of the characters are filled with color data of the characters, whereby the compressed data amount of the text color data plane is reduced.

Thus, the multiplexer 15 selects transmission data in accordance with the determination result of the mode determination section 14 and transmission data in the multilayer data format can be prepared.

Figure 15A:
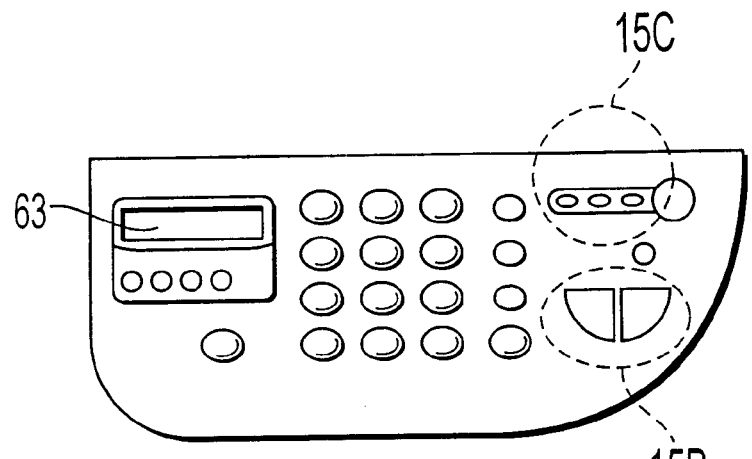
FIG. 15 is a schematic representation of an example of a control panel.
Figure 15B:
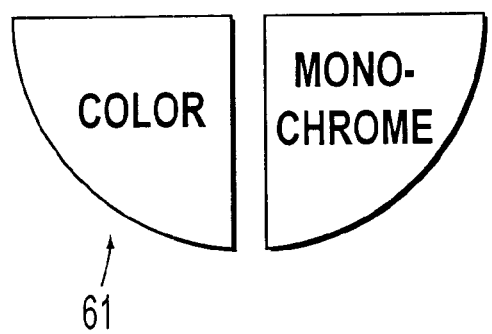
Figure 15C:
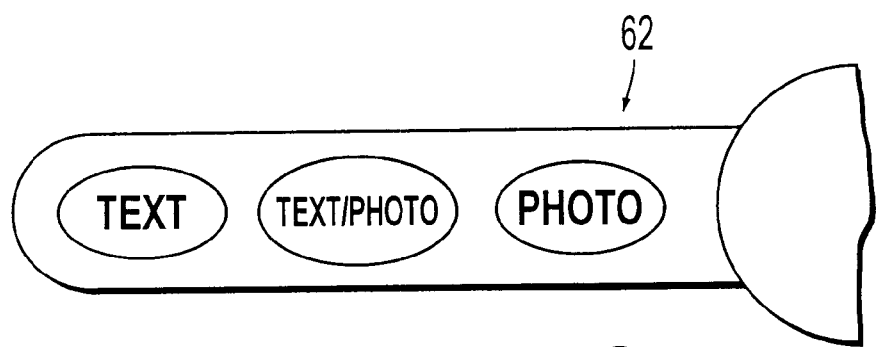

FIG. 15 is a schematic representation of an example of a control panel. In the figure, numeral 61 is a color selection button section, numeral 62 is an original selection button section, and numeral 63 is a display section. In the example shown in FIG. 15, color selection buttons 61 for specifying whether the original to be transmitted is color or monochrome and the original selection buttons 62 for selecting the original type from among text, photo image, and both of text and photo image are provided. The display section 63 is also provided for displaying various messages, selection state, etc., for the user.

To transmit an image, the user presses the color selection button 61 on the control panel as shown in FIG. 15 to specify whether the original to be transmitted is color or monochrome. The specification contents are displayed on the display section 63 or the color selection button 61 itself is blinked, for example, whereby the user can be informed of the specification contents. The color selection button 61 forms a part of the image specification section 5, which accepts the specification contents and sends them to the selection section 6. If the color determination section 4 determines that the transmitted original is a monochrome image, the user interface may be controlled so as to inhibit the user from making color specification.

To transmit an image, the user may press the original selection button 62 on the control panel as shown in FIG. 15 to select the type of original to be transmitted from among text, photo image, and both of text and photo image. The specification contents are displayed on the display section 63 or the original selection button 62 itself is blinked, for example, whereby the user can be informed of the specification contents. The original selection button 62 forms a part of the original mode specification section 8, and the specification contents are input to the selector 23 as original mode specification information. At the determination time of the mode determination section 14, the user's specification with the original selection button 62 may be considered.

If the user thus specifies that the transmitted original is color by pressing the color selection button 61, for example, and the color determination section 4 also determines that image information is color, the selection section 6 selects the transmission data in the multilayer data format output from the multilayer data processing section 2 and transmits the selected data through the transmission section 7. If the color determination section 4 determines that image information is monochrome although the user specifies that the transmitted original is color by pressing the color selection button 61, or if the user specifies that the transmitted original is monochrome by pressing the color selection button 61, the selection section 6 selects the transmission data in the 1-layer data format output from the 1-layer data processing section 3 and transmits the selected data through the transmission section 7. If the user specifies that the transmitted original is monochrome by pressing the color selection button 61, the original is handled as monochrome even if the color determination section 4 determines that the transmitted original is color. The transmission data in the 1-layer data format is selected by the selector 23 in accordance with the user's selection with the original selection button 62. If the original type is selected as text, the transmission data provided by compressing the image information binarized by the binarization processing section 21 is selected and transmitted. If the original type is photo or both text and photo, the transmission data comprising multivalued data compressed by the compressor 22b is selected and transmitted. Of course, the compression technique and the image processing technique for the original type photo may be made different from those for the original type both text and photo.

If the user specifies whether or not the input image information is color with the color selection button 61, etc., as described above, the color determination section 4 in FIG. 1 may not be an indispensable member. However, the user's specification is collated with the determination result of the color determination section 4, whereby it is made possible to control so as to suppress wasteful communication cost of color image transmission in such a manner to inhibit the user from specifying color image transmission on the control panel or forcibly transmit the transmission data in the 1-layer data format if the color determination section 4 determines that the input image information is a monochrome image, for example, as described above.

As seen from the description made so far, according to the first embodiment, whether or not the input image information is a color image is determined and if the input image information is a color image, it is separated into multiple layers in response to the attributes, then the resultant image data pieces are compressed by their respective optimum compression techniques and further the image data planes to be transmitted are selected and transmitted in response to the image data composition, whereby color image data can be transmitted with high image quality and moreover with high efficiency.

Figure 16:
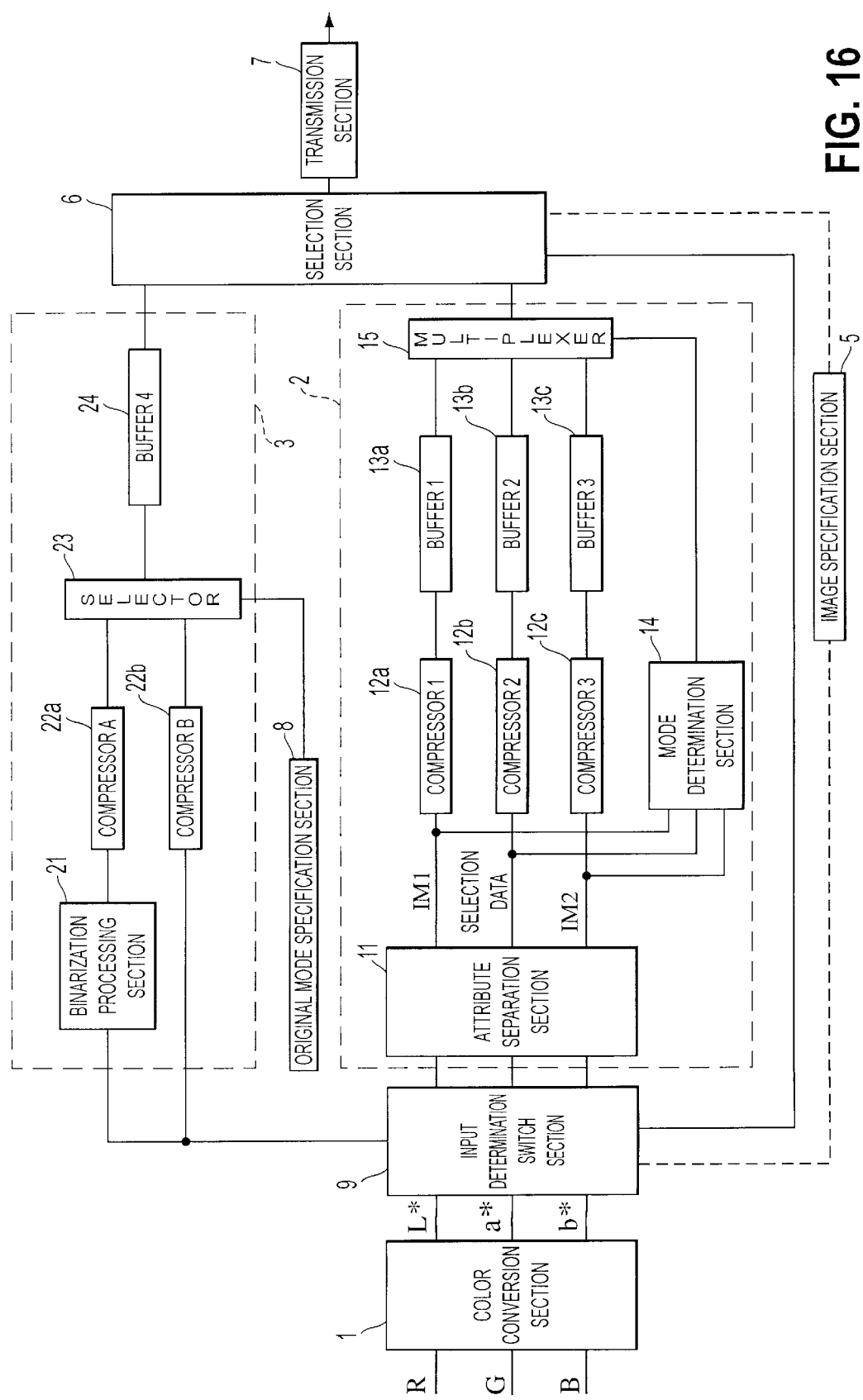
FIG. 16 is a block diagram to show a modified embodiment of the first embodiment of the image transmitting system of the invention.

FIG. 16 is a block diagram to show a modified embodiment of the first embodiment of the image transmitting system of the invention. Parts identical with or similar to those previously described with reference to FIG. 1 are denoted by the same reference numerals in FIG. 16 and will not be discussed again. In FIG. 16, numeral 9 is an input determination switch section. In the configuration shown in FIG. 1, the input image information is input to both the multilayer data processing section 2 and the 1-layer data processing section 3; in the modified embodiment, the input determination switch section 9 passes image information to either a multilayer data processing section 2 or a 1-layer data processing section 3.

The input determination switch section 9 has both the functions of a color determination section 4 and a selection section 6. It determines whether the input image information is color or monochrome image data, and selects either the multilayer data processing section 2 or the 1-layer data processing section 3, then passes the input image information to the selected data processing section 2 or 3. The input determination switch section 9 also controls a selection section 6 so as to select output of either the multilayer data processing section 2 or the 1-layer data processing section 3 selected. For example, if the input image information is a color image, the image information input to the multilayer data processing section 2 is passed; if the input image information is a monochrome image, processing in the multilayer data processing section 2 is inhibited and the image information input to the 1-layer data processing section 3 is passed.

Specification information from an image specification section 5 can also be input to the input determination switch section 9; the image transmitting system may be configured so as to select either the multilayer data processing section 2 or the 1-layer data processing section 3 also considering user's specification.

In the modified embodiment, the image information is input to either the multilayer data processing section 2 or the 1-layer data processing section 3, thus transmission data is output only from either the multilayer data processing section 2 or the 1-layer data processing section 3. Therefore, the selection section 6 can also be omitted.

Figure 17:
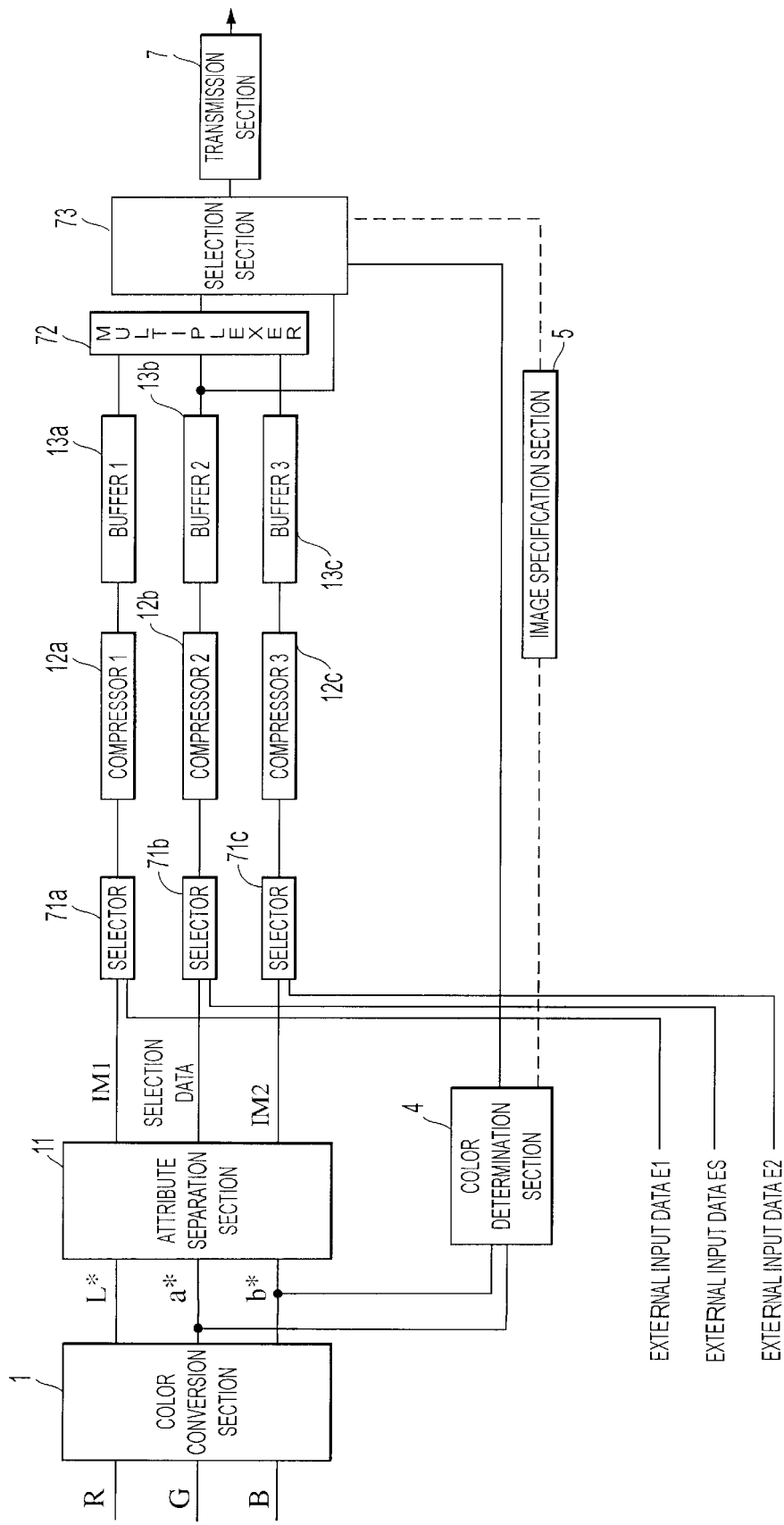
FIG. 17 is a block diagram to show a second embodiment of the image transmitting system of the invention.

FIG. 17 is a block diagram to show a second embodiment of the image transmitting system of the invention. Parts identical with or similar to those previously described with reference to FIG. 1 are denoted by the same reference numerals in FIG. 17 and will not be discussed again. In FIG. 17, numerals 71a–71c are selectors, numeral 72 is a multiplexer, and numeral 73 is a selection section. In the second embodiment, the 1-layer data processing section 3 described above is not provided and for a monochrome image, only selection data in the multilayer data format is extracted and is transmitted in the 1-layer data format. The mode determination section 14 described above is also deleted. Further, the embodiment can also deal with input of image information in the multilayer data format from an external system such as a personal computer.

Generally, most of image data handled in monochrome image transmitting systems typified by G3/G4 facsimiles is text and line drawings as main components. This means that when a color determination section 4 determines that input image data is a monochrome image, if the image transmitting system sends selection data containing outline information of text and line drawings, it functions sufficiently as an image transmitting system. When the color determination section 4 determines that the input image information is a monochrome image, the selection section 73 selects compressed code data of selection data stored in a buffer 13b, whereby the monochrome image can be transmitted in a similar manner to the conventional manner. If the color determination section 4 determines that the input image information is a color image, the selection section 73 selects the transmission data in the multilayer data format output from the multiplexer 72. As in the first embodiment, the selection section 73 may select the transmission data in accordance with color or monochrome specification for the transmission original, made by the user on an image specification section 5 or by adding the user's specification.

Unlike the multiplexer 15 in the first embodiment, the multiplexer 72, to which the transmission image mode determination result is not input, reads the data stored in buffers 13a–13c in a predetermined order and prepares and outputs transmission data in the multilayer data format. Since mode determination is not executed, for example, if the text color or background color is a single color, a text color data plane or a background image data plane is transmitted. However, since the text color data plane or the background image data plane has an extremely small number of change points, it is compressed into an extremely small data amount and overhead does not much occur as compared with transmission of additional information only. Of course, a mode determination section 14 may be provided for selecting the plane to be transmitted as in the first embodiment.

The selectors 71a–71c are selection circuits for inputting first piece of image data E1, selection data E2, and second piece of image data E2 generated by an external system in place of output of an attribute separation section 11. Image data with a mixture of a picture such as a photo and color text, line drawing generally is prepared often using a document preparation application of a computer. Such application-prepared image data is represented, for example, in a document description language, etc., and is expanded into bit map image data in a printer controller, then is printed out. In the document description language, text to be drawn and its color information are represented in character strings and code strings and a font indicating the outlines of characters is used to expand the image data into bit map image data. At this time, the outlines of text and line drawing parts are extracted as selection data and the color information corresponding to the text to be drawn can also be extracted. The image information can be thus disassembled into the multilayer data format in an external system such as a computer. The image information is thus disassembled into the multilayer data format in a computer, whereby a determination error that can occur at the attribute determination time can be prevented from being mixed and color image transmission with higher quality can be realized.

In the embodiment, if image information in the multilayer data format is input from an external system, the color determination section 4 does not execute color determination, thus transmission data in the multilayer data format is always transmitted. Of course, color determination may be executed also for the image information input from the external system, and if the input image information is a monochrome image, only the selection data plane may be transmitted.

Figure 18:
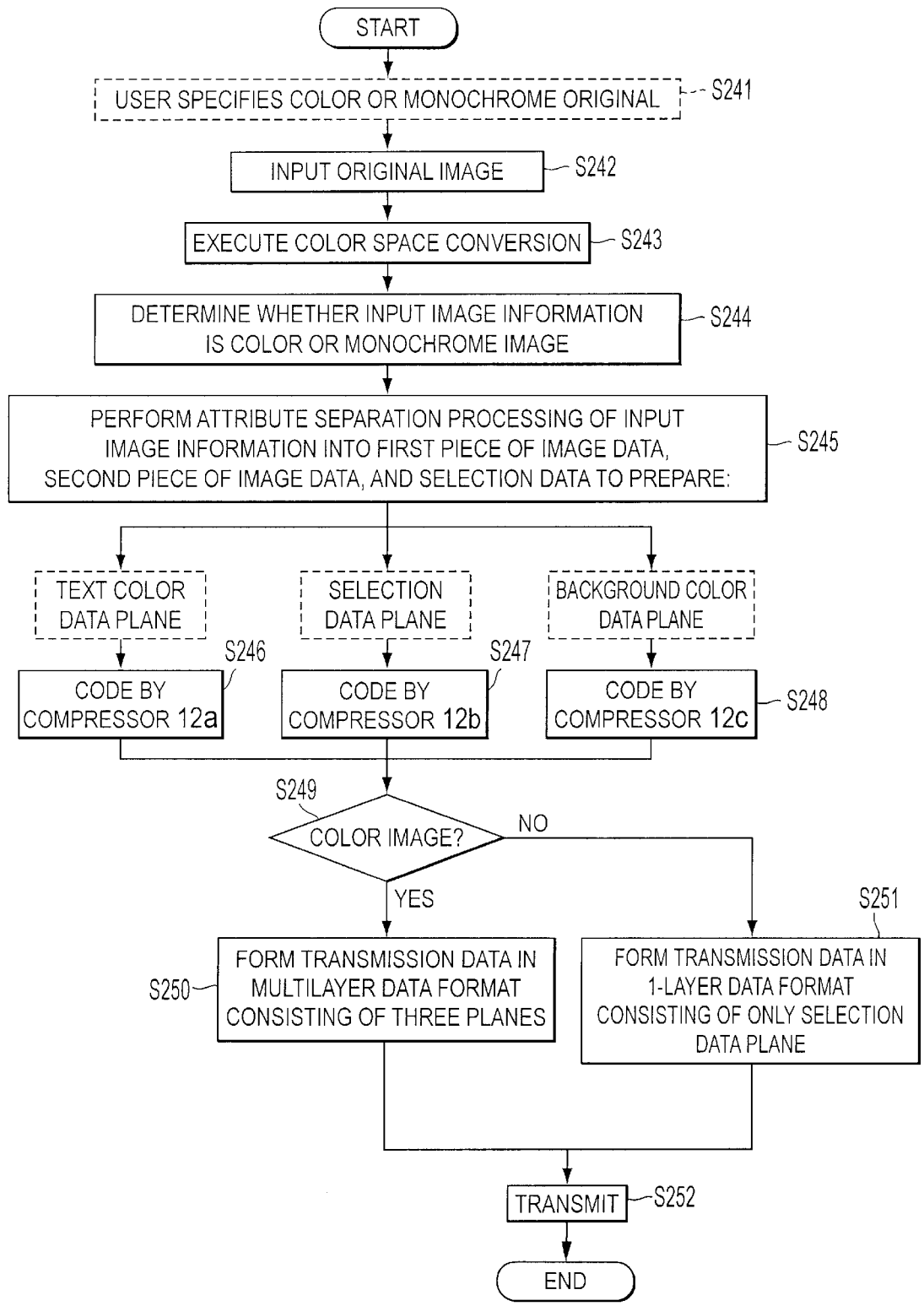
FIG. 18 is a flowchart to show an operation example in the second embodiment of the image transmitting system of the invention.

FIG. 18 is a flowchart to show an operation example in the second embodiment of the image transmitting system of the invention. Here, image information not separated into the multilayer data format is input. Steps S241–S244 in FIG. 18 are similar to steps S201–S204 in the first embodiment previously described with reference to FIG. 2. To transmit an image, the user can specify whether the original to be transmitted is color or monochrome through the image specification section 5 at step S241. Next, at step S242, image information is input. At step S243, to enable the receiving system party to reproduce a good color image, a color conversion section 1 executes color space conversion for the input image information. At step S244, the color determination section 4 determines whether the input image information is a color or monochrome image. The determination result is used at step S249.

At step S245, the attribute separation section 11 executes attribute separation of the input image information into three planes of a first image data plane, a second image data plane, and a selection data plane in a similar manner to that in the first embodiment. The first image data plane is compressed and coded by a compressor 12a at step S246, the second image data plane is compressed and coded by a compressor 12c at step S248, and the selection data plane is compressed and coded by a compressor 12b at step S247. Specific examples of the data planes and the compressors corresponding thereto are similar to those described above in the first embodiment.

At step 5249, if the determination result of the color determination section 4 at step S244 indicates color image, control goes to step S250 at which the selection section 73 selects output of the multiplexer 72 and adds information indicating transmission of all the three planes as additional information, then sends the selection data plane, first image data plane, and second image data plane output in a predetermined order from the multiplexer 72 to a transmission section 7. On the other hand, at step S249, if the determination result of the color determination section 4 at step S244 indicates monochrome image, control goes to step S251 at which the selection section 73 adds information indicating transmission of only the selection data plane and sends the selection data plane to the transmission section 7. Thus, if the color determination section 4 determines that the input image information is a color image, the transmission data in the multilayer data format is sent to the transmission section 7; if the color determination section 4 determines that the input image information is a monochrome image, the transmission data in the 1-layer data format with only the selection data plane is sent to the transmission section 7.

At step S252, the transmission section 7 transmits the transmission data in the multilayer or 1-layer data format prepared as described above to a public line, a network line, etc.

Figure 19:
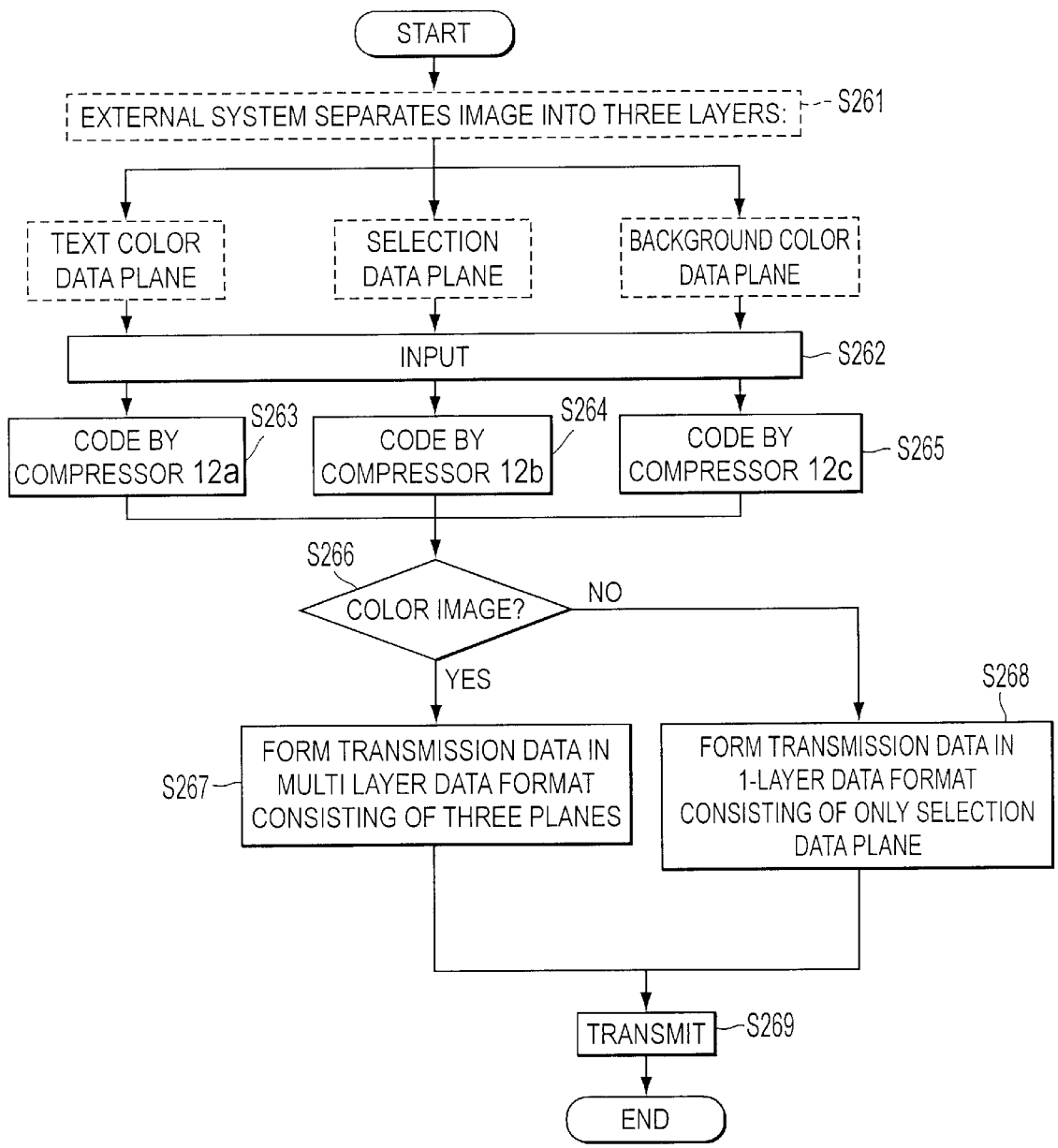
FIG. 19 is a flowchart to show another operation example in the second embodiment of the image transmitting system of the invention.

FIG. 19 is a flowchart to show another operation example in the second embodiment of the image transmitting system of the invention. Here, image information previously separated into the multilayer data format by an external system is input. At step S261, image information is separated into first piece of image data, second piece of image data, and selection data and a first image data plane, a second image data plane, and a selection data plane are prepared by an external system such as a computer, then are input at step S262. The image information is input over a network line, a leased signal line, etc., or via a portable storage medium, etc., or by any other means. At this time, the selectors 71a–71c select the signal lines from the external machine.

The processing at step S263 and later is similar to that at step S246 and later and will not be discussed again. Thus, the image transmitting system can also deal with input of image information in the multilayer data format from the external system and transmit the transmission data in the multilayer data format.

In the second embodiment, attention is focused on the fact that most of already existing monochrome originals are text-oriented images, and if the transmission original is not a color original, only the selection data in the multilayer data format is selected as the transmission data, whereby the configuration of the system can be simplified. As seen from the description of the flowchart shown in FIG. 19, if an external system such as a computer is used, image data in the multilayer data format can also be transmitted. Of course, as in the first embodiment, even a color image with a mixture of a picture, photo image and a text, line drawing image can be transmitted without degrading the image quality and with high efficiency, and only binary selection data is also transmitted for monochrome images as described above, thus highly efficient transmission is enabled as before.

In the description of the first and second embodiments, the resolutions of the first image data plane, the second image data plane, and the selection data plane are not mentioned. However, the resolution responsive to the attribute of the image data contained in each plane is set for the plane, whereby while high resolution of a text portion is made compatible with gradation of a picture portion, the transmission data amount can be reduced and highly efficient image transmission can be easily accomplished. It is advisable to perform such resolution conversion before compression of the compressors 12a–12c after the attribute separation section 11. At this time, the optimum resolution conversion techniques for the attributes of the image data contained in the planes can be used. Of course, if uniform resolution conversion is executed for all the planes, it can be executed before attribute separation.

In the embodiments, the color conversion processing of the color conversion section 1 is performed before the attribute separation. However, for example, if color conversion processing is performed corresponding to the first piece of image data and the second piece of image data, it may be performed after the attribute separation. Further, various image processing can be performed; if image processing is performed for all portions of input image information, it can be performed before the attribute separation or if image processing responsive to each attribute is performed, it can be performed after the attribute separation.

Figure 20:
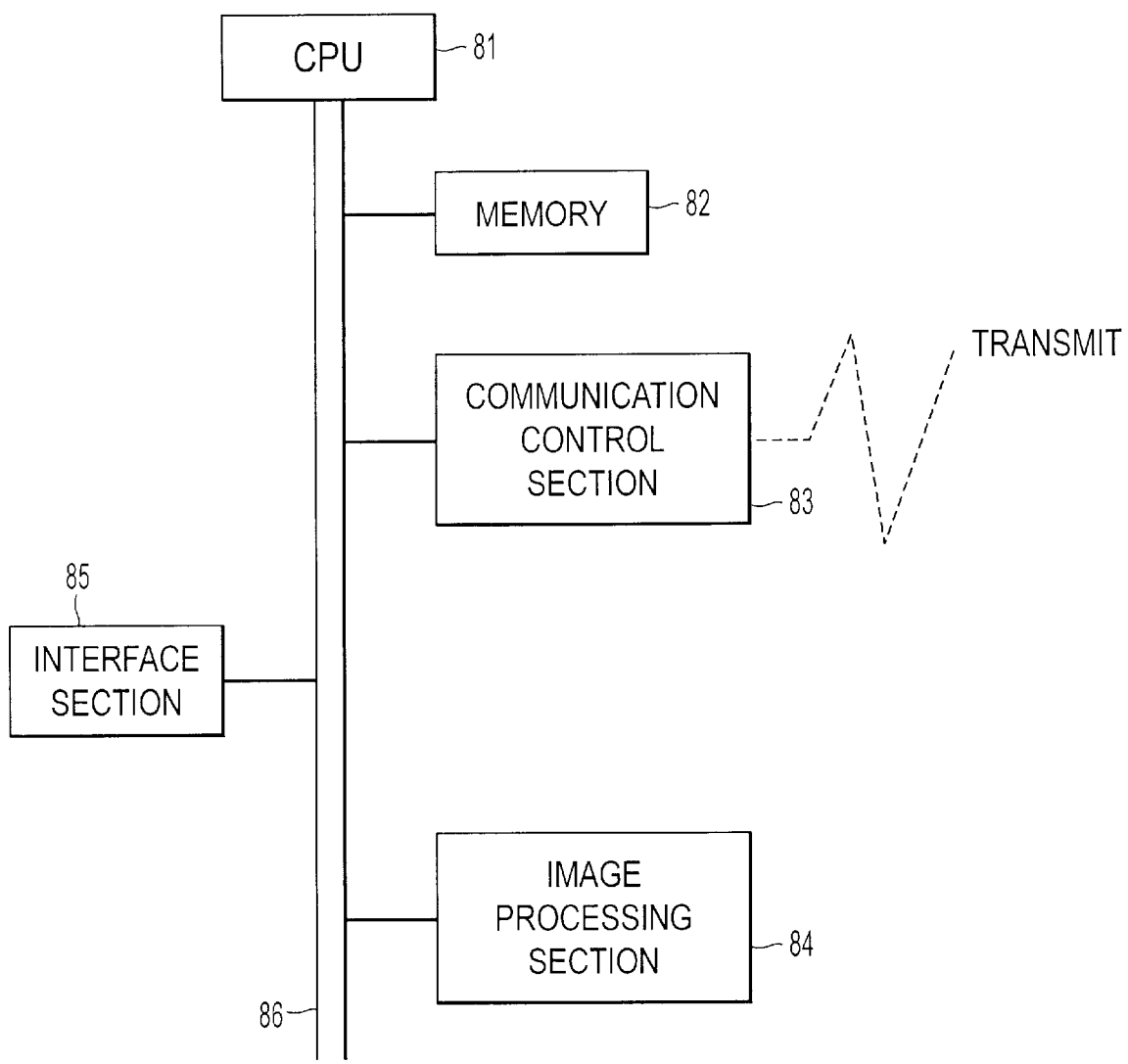
FIG. 20 is a block diagram to show a specific example in the first and second embodiments of the image transmitting system of the invention.

FIG. 20 is a block diagram to show a specific example in the first and second embodiments of the image transmitting system of the invention. In the figure, numeral 81 is a CPU (central processing system), numeral 82 is memory, numeral 83 is a communication control section, numeral 84 is an image processing section, numeral 85 is an interface section, and numeral 86 is a bus. The CPU 81 controls the entire image transmitting system. It performs processing for some functions of the configurations previously described with reference to FIG. 1 and FIG. 17 in some times. The memory 82 temporarily stores the image information input through the interface section 85, the image information in the multilayer or 1-layer data format provided by the image processing section 84, and the like. The buffers 13a–13c, the buffer 24, etc., previously described with reference to FIG. 1, FIG. 17 can also be formed of the memory 82. The communication control section 83, which contains the transmission section 7, performs communication control of line connection, protocol control, etc., to transmit image data between the image transmitting system and a receiving system party and transmits the image data in the multilayer or 1-layer data format. The image processing section 84 performs processing of all or some of the color conversion section 1, the multilayer data processing section 2, the 1-layer data processing section 3, the color determination section 4, the selection section 6, etc., in the first embodiment or performs processing of all other than the transmission section 7 shown in FIG. 17 or some in the second embodiment as instructed by the CPU 81 or in collaboration therewith. The interface section 85 receives the image information to be transmitted. The bus 86 connects the CPU 81, the memory 82, the communication control section 83, the image processing section 84, and the interface section 85 in the image transmitting system.

According to such a configuration, the image transmitting system of the invention can be easily provided using a personal computer remarkably improved in performance or the like. The configuration shown in° FIG. 20 is an example and other various devices may be added thereto. For example, if a storage unit is connected, image information stored in the storage unit can be selected and transmitted. An image is input and edited on a computer in which the image transmitting system of the invention is installed, and the image information can also be input in the multilayer data format as shown in the second embodiment.

Figure 21:
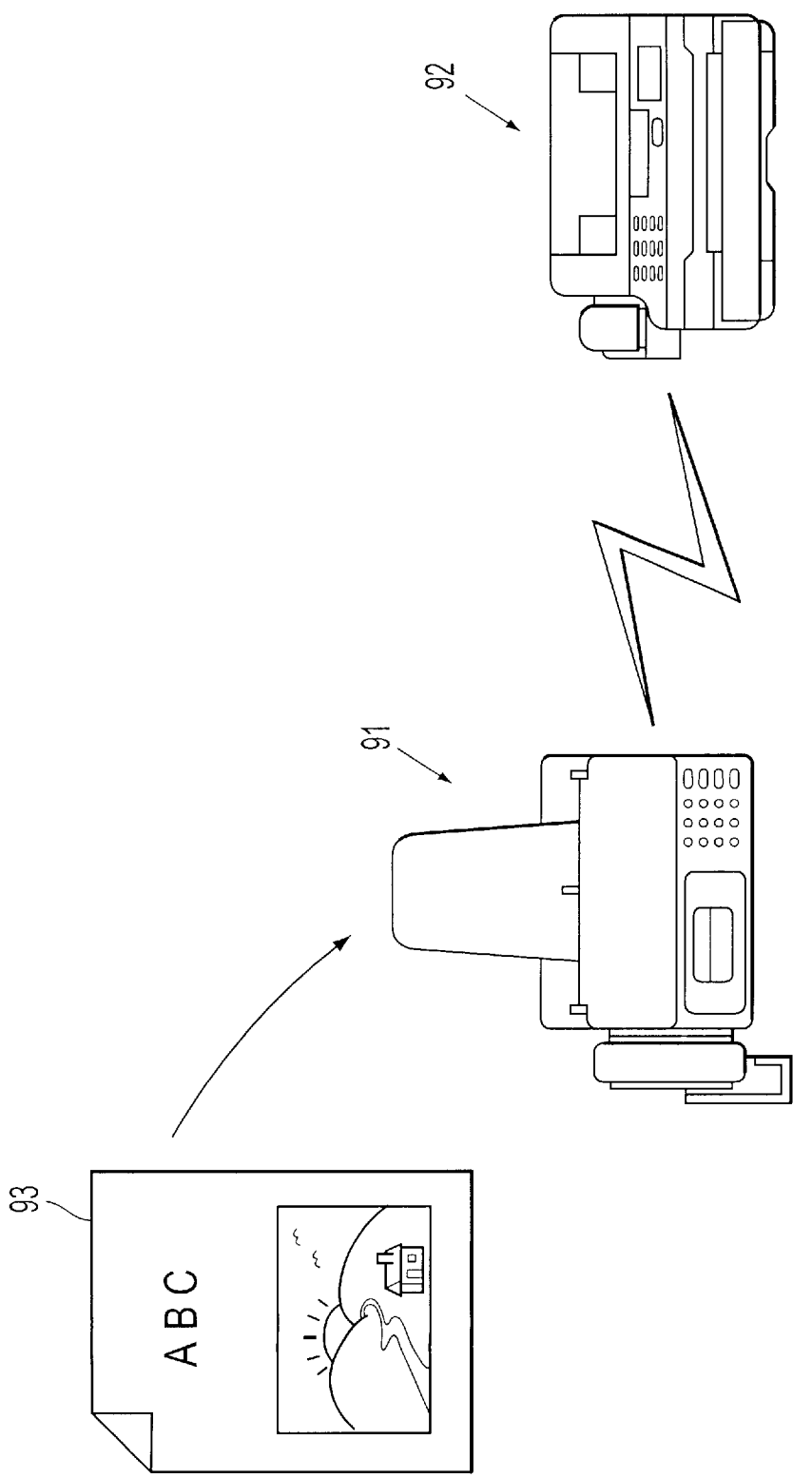
FIG. 21 is an illustration to show the configuration of a first application example of the image transmitting system of the invention.

FIG. 21 is an illustration to show the configuration of a first application example of the image transmitting system of the invention. In the figure, numeral 91 is a transmitting system, numeral 92 is a receiving system, and numeral 93 is an original image. The transmitting system 91 comprises the image transmitting system of the invention as shown in the first, second embodiment. The transmitting system 91 scans and inputs the color or monochrome original image 93 and determines whether the image information input by the image transmitting system of the invention is a color or monochrome image or adds also the user's specification made on an operation panel. To transmit the input image information as a color image, the transmitting system 91 converts the input image information into the multilayer data format and transmits the information in the format; to transmit the input image information as a monochrome image, the transmitting system 91 converts the input image information into the 1-layer data format and transmits the information in the format. Of course, the transmitting system 91 has a reception function.

The receiving system 92 reconstructs the transmission data in the multilayer or 1-layer data format sent from the transmitting system 91 and outputs the data. When the receiving system 92 receives the transmission data in the multilayer data format, for example, it extracts three compressed image planes from the transmission data in the multilayer data format and decodes the image planes, then selects and outputs data of the first or second image plane in response to the value for each pixel of the selection image plane, whereby the image data can be reconstructed. When receiving the transmission data in the 1-layer data format, the receiving system 92 can output an original image by performing reception processing like a normal monochrome facsimile. Of course, the receiving system 92 has a transmission function.

As a special example, if the receiving system 92 does not have a function of receiving the transmission data in the multilayer data format, the user may operate a color selection button 61 on an operation panel, for example, as shown in FIG. 15 in the transmitting system 91 for entering a monochrome transmission command. In response to the command, transmission in the multilayer data format is inhibited and image information can be transmitted in the 1-layer data format as with a normal facsimile from the transmitting system 91, whereby the receiving system 92 can the image information as normal monochrome facsimile data and output an original image. Thus, the image transmitting system of the invention can also be used with receiving systems that cannot receive transmission data in the multilayer data format.

Figure 22:
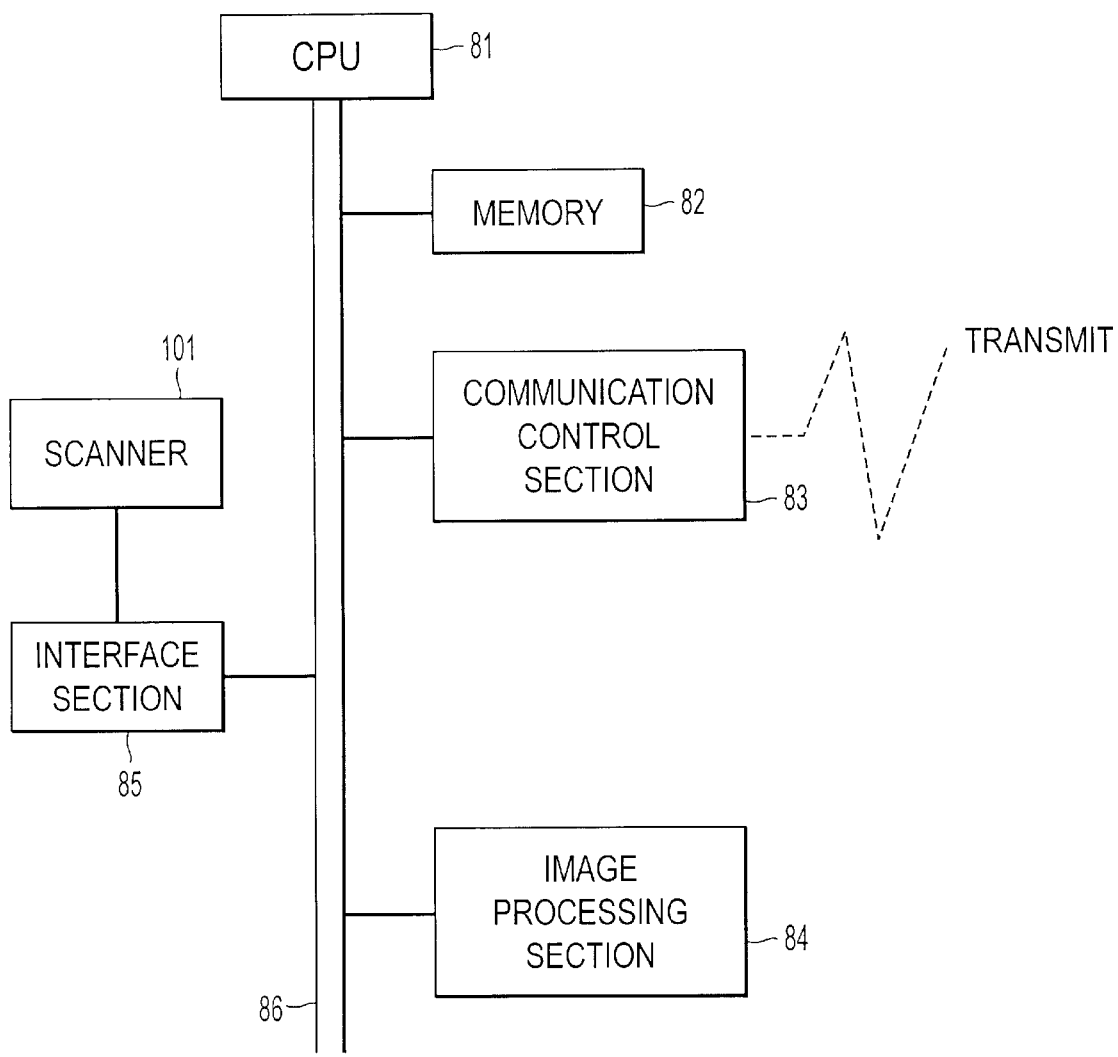
FIG. 22 is a block diagram to show an example of the internal configuration of a transmitting system in the first application example of the image transmitting system of the invention.

FIG. 22 is a block diagram to show an example of the internal configuration of the transmitting system in the first application example of the image transmitting system of the invention. Parts identical with or similar to those previously described with reference to FIG. 20 are denoted by the same reference numerals in FIG. 22 and will not be discussed again. In FIG. 22, numeral 101 is a scanner. The transmitting system 91 scans and inputs the original image 93 as shown in FIG. 21. As an example of the input unit for the purpose, the scanner 101 is connected to an interface section 85. Other members are the same as those shown in FIG. 20.

Figure 23:
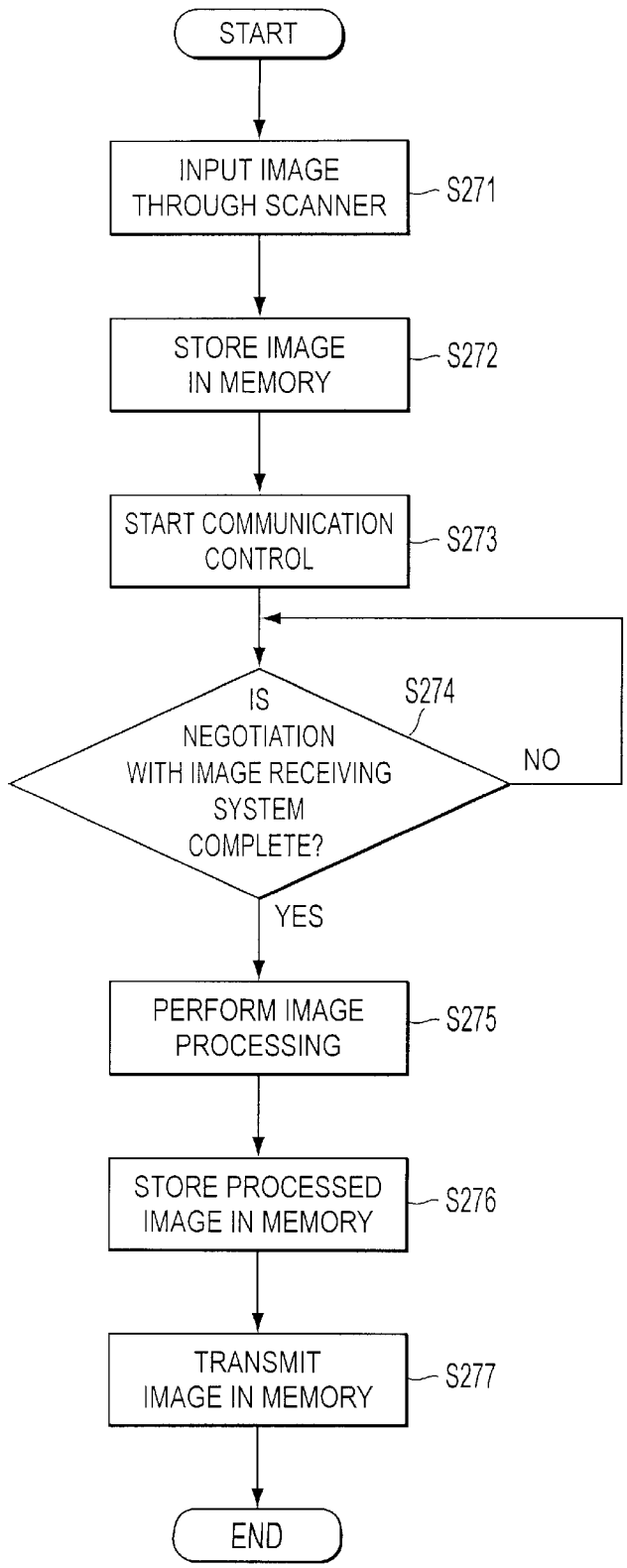
FIG. 23 is a flowchart to show an operation example of the transmitting system in the first application example of the image transmitting system of the invention.

FIG. 23 is a flowchart to show an operation example of the transmitting system in the first application example of the image transmitting system of the invention. First, at step S271, the scanner 101 is used to read the original image 93 to be transmitted. At step S272, the read image information is stored in memory 82 through the interface section 85 under the control of a CPU 81.

Subsequently, at step S273, control of communication with the receiving system 92 is started under the control of the CPU 81. At this time, negotiation with the receiving system 32 about the system environment is executed and the system environment information is managed in the CPU 81. At step S274, if it is determined that the negotiation is complete, control goes to step S275 at which, for example, an image processing section 84 determines whether the image information to be transmitted is a color or monochrome image, and converts the input image information into transmission data in the multilayer or 1-layer data format based on the determination result, the user's specification made on the operation panel, etc., and the like, as described above in the first and second embodiments of the image processing system of the invention.

The transmission data in the multilayer or 1-layer data format provided by the image processing section 84 is again stored in the memory 82 at step S276. The memory 82 may be provided with a capacity capable of storing image data before conversion and image data after conversion or may be provided with a capacity for storing image data under dynamic control of write and read.

When the CPU 81 recognizes that the transmission data is stored in the memory 82, it transmits the transmission data through a communication control section 83 at step S277 and terminates the processing. For example, if the input image information is a monochrome image, the transmission data is transmitted in the 1-layer data format, so that highly efficient transmission as with a normal facsimile is enabled. If the input image information is a color image, it is converted into the multilayer data format and image processing and compression and coding processing are performed in response to the characteristics of the layers, then the resultant data is transmitted, thus can be transmitted with high efficiency with the image quality maintained.

Figure 24:
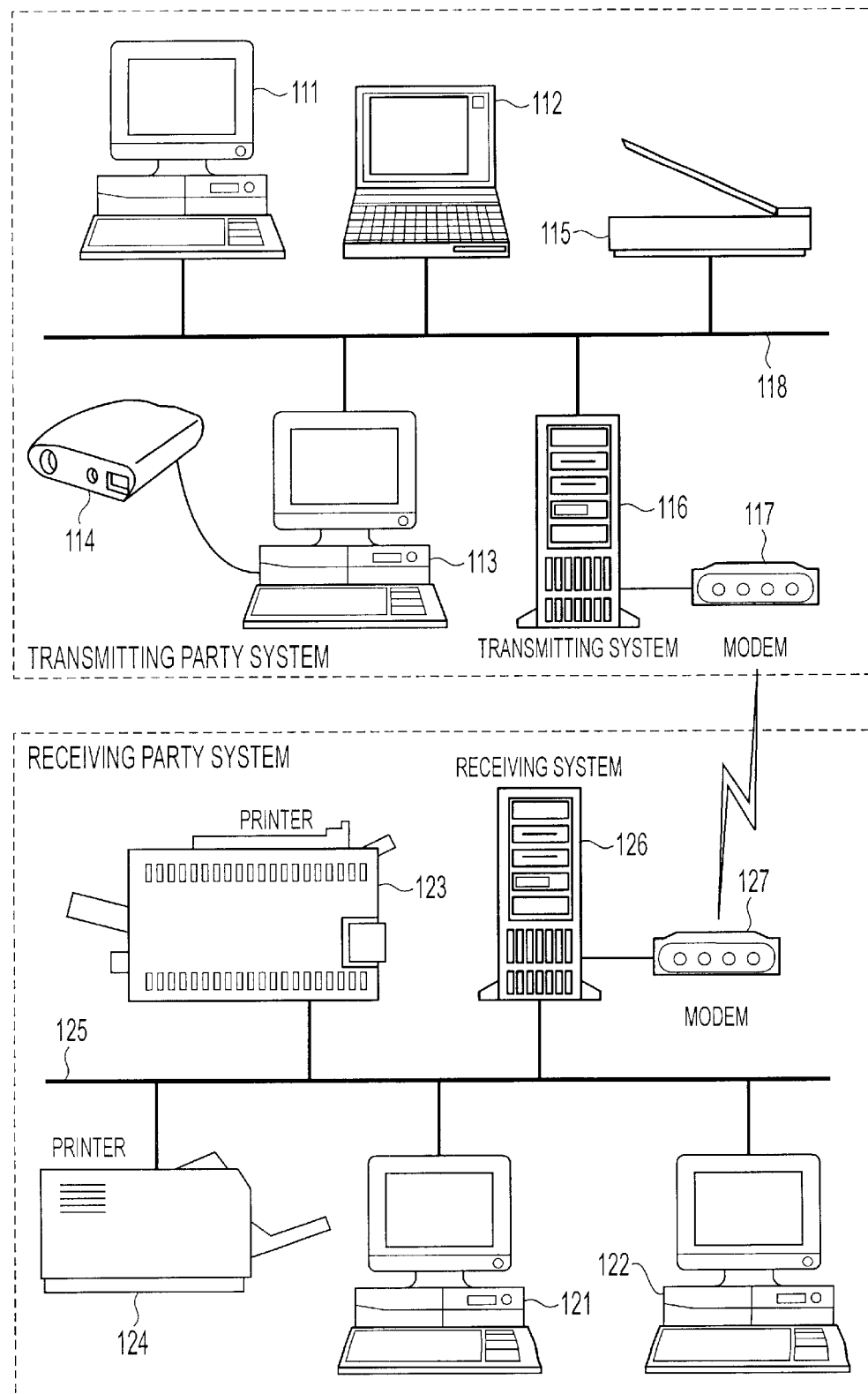
FIG. 24 is an illustration to show the configuration of a second application example of the image transmitting system of the invention.

FIG. 24 is an illustration to show the configuration of a second application example of the image transmitting system of the invention. In the figure, numerals 111–113 are host computers, numeral 114 is a digital camera, numeral 115 is a scanner, numeral 116 is a transmitting system, numeral 117 is a modem, numeral 118 is a transmitting party network, numerals 121 and 122 are client computers, numerals 123 and 124 are printers, numeral 125 is a receiving party network, numeral 126 is a receiving system, and numeral 127 is a modem. A transmitting party system comprises the host computers 111–113, the scanner 115, the transmitting system 116, etc. connected by the transmitting party network 118. The digital camera 114 is connected to the host computer 113 and the modem 117 is connected to the transmitting system 116.

For example, the transmitting system 116 comprises the configuration shown above as the first embodiment, second embodiment of the image transmitting system of the invention. It receives image information directly from the host computers 111–113 and the scanner 115 connected on the transmitting party network 118 or via the host computer 113 from the digital camera 114 and determines whether the received image information is a color or monochrome image as described above in the first and second embodiments. If the image information is a color image, the transmitting system 116 transmits the transmission data in the multilayer data format via the modem 117 to a receiving party system; if the image information is a monochrome image, the transmitting system 116 transmits the transmission data in the 1-layer data format via the modem 117 to the receiving party system.

The receiving party system comprises the client computers 121 and 122, the printers 123 and 124, the receiving system 125, etc., connected by the receiving party network 125. The receiving system 126, to which the modem 127 is connected, can receive transmission data sent over a communication line through the modem 127.

The receiving system 125 analyzes the data received at the modem 127 and processes the data like a normal monochrome facsimile if the data is in the 1-layer data format, or extracts 3-plane data, processes the extracted data, then combines the data if the data is in the multilayer data format. Then, the receiving system 125 outputs the data to the printer 123 or 124, or performs necessary processing by the client computer 121 or 122, then can store the resultant data intact or output the data from the printer 63 or 64.

Figure 25:
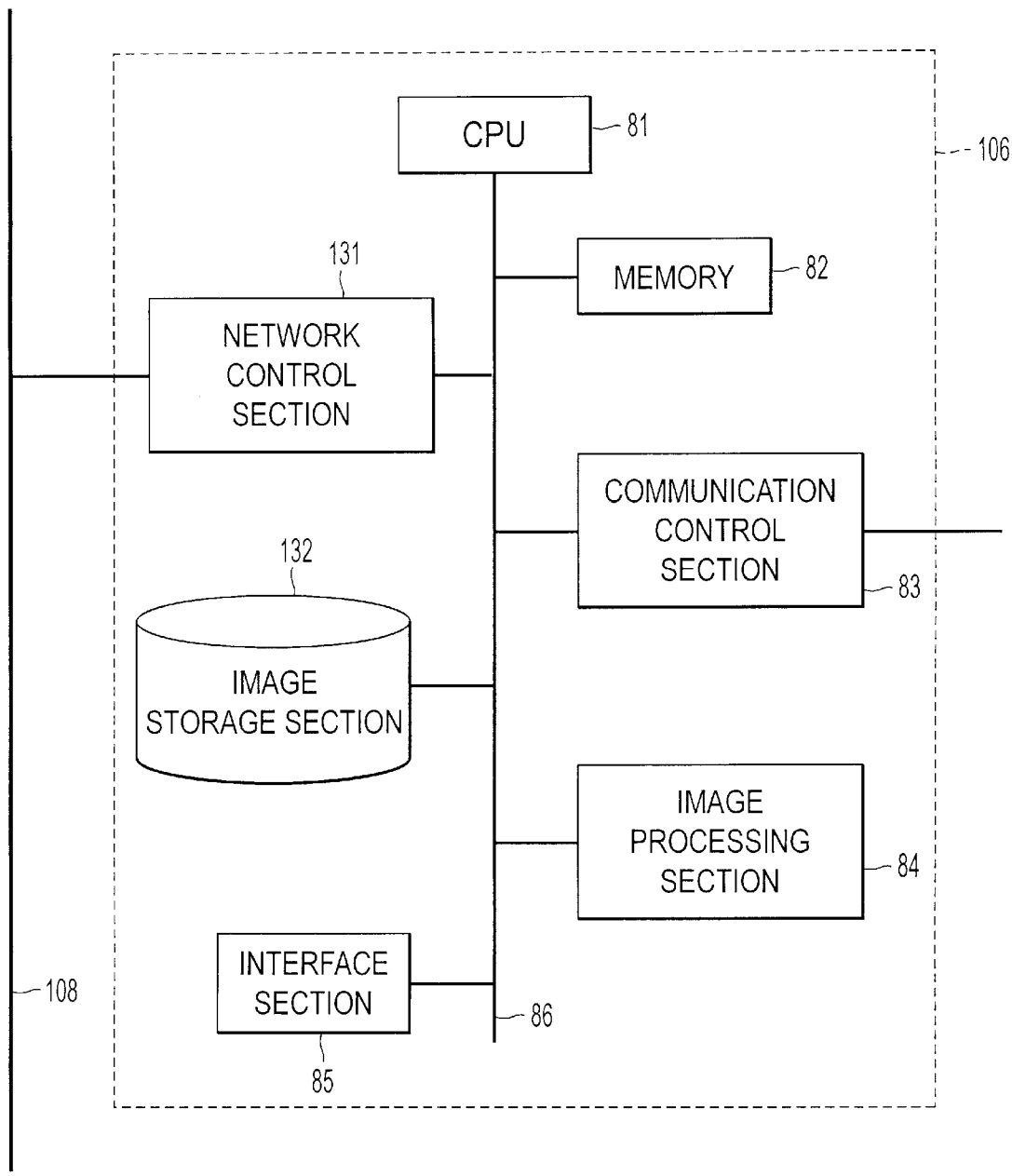
FIG. 25 is a block diagram to show an example of the internal configuration of the transmitting system in the second application example of the image transmitting system of the invention.

FIG. 25 is a block diagram to show an example of the internal configuration of the transmitting system in the second application example of the image transmitting system of the invention. Parts identical with or similar to those previously described with reference to FIG. 20 are denoted by the same reference numerals in FIG. 25 and will not be discussed again. In FIG. 25, numeral 131 is a network control section and numeral 132 is an image storage section, numeral 77 is an image processing section. The transmitting system 116 shown in FIG. 25 further comprises the network control section 131 and the image storage section 132 connected to a bus 86 in addition to the configuration of the specific example of the image transmitting system of the invention shown in FIG. 20. According to such a configuration of the transmitting system 116, the function as the image transmitting system of the invention can be at lest provided. In addition, the image information to be transmitted can be gotten through the network or the image information to be transmitted or transmission data can be stored.

The network control section 131 receives image data from the host computers 111–113 and the scanner 115 through the network 118 or transmits image data to the host computers 111–113 through the network 118. In the example, the communication control section 83 is further connected to the modem 117 and transmits transmission data through the modem 117. As shown in FIG. 24, a communication line such as a general telephone line is further connected to the modem 117 for communication and transmission data can be transmitted over the communication line. The image storage section 132 can store the input image information or the transmission data provided by the image processing section 84. The stored image information or transmission data can be read arbitrarily or under a predetermined condition.

In the example, nothing is connected to the interface section 85. However, as in the example shown in FIG. 22, for example, an image input machine such as a scanner or a digital camera is connected, whereby image information can be input directly to the transmitting system 116 not via the network 108.

Figure 26:
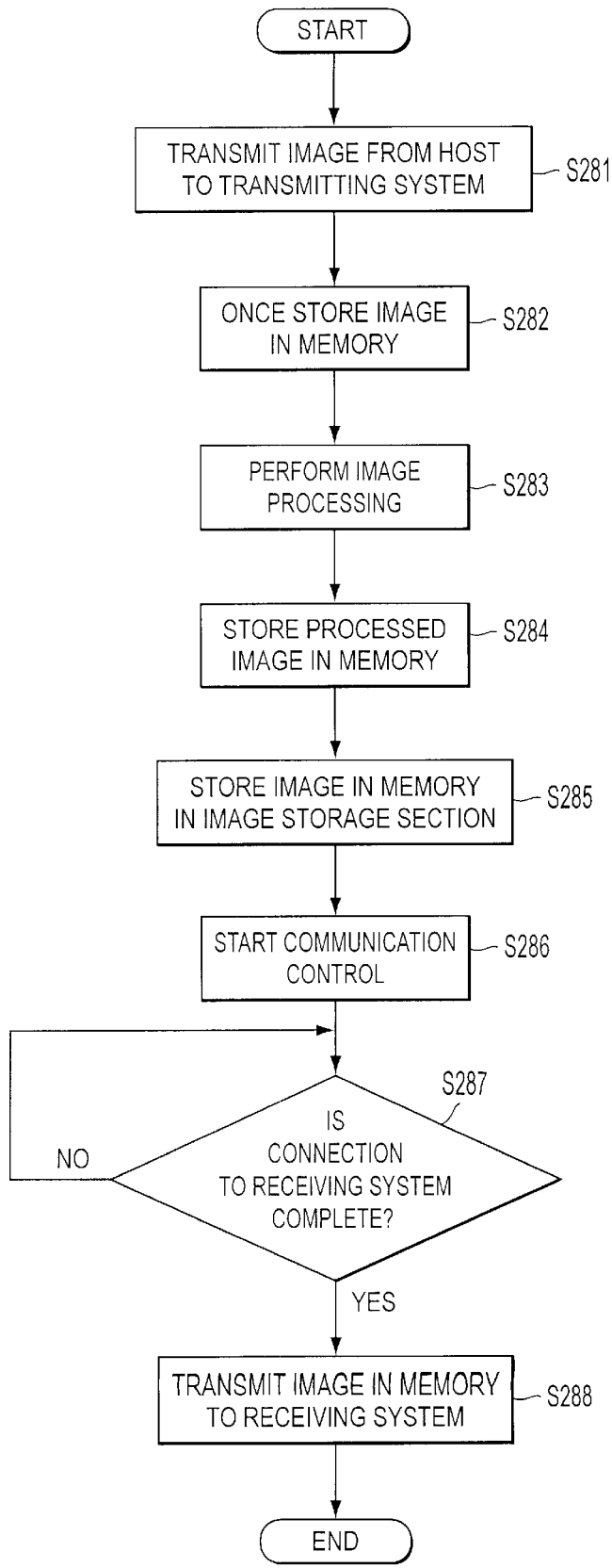
FIG. 26 is a flowchart to show an operation example in the second application example of the image transmitting system of the invention.

FIG. 26 is a flowchart to show an operation example in the second application example of the image transmitting system of the invention. It shows an operation flow from preparation of an image by the host computer 111–113 or image read through the scanner 115 or the digital camera 114 to transmission. First, at step S281, one of the host computers 111–113 and the scanner 115 connected to the network 118 requests the transmitting system 116 to transmit an image and transmits the image thereto.

Upon reception of the transmission request through the network control section 131, the transmitting system 116 sets predetermined parameters in a DMAC (Direct Memory Access Controller) register (not shown) by the CPU 81. The parameters may include the data storage address in the memory 82, the transfer rate, etc. Upon completion of setting the parameters, the CPU 81 issues a command indicating a ready state to the network control section 131, then at step S282, stores image information transmitted in sequence from any of the host computers 111–113 or the scanner 55 in the memory 82.

If the transmitting system 116 contains the configuration shown in the first embodiment of the image transmitting system of the invention, the received image information is a normal 1-layer color or monochrome image. If the transmitting system 116 contains the configuration shown in the second embodiment of the image transmitting system of the invention, the received image information is a normal 1-layer color or monochrome image or image information separated into the multilayer data format by the host computers 111–113.

When all image information is stored in the memory 82, the CPU 81 sets parameters such as the image read address and the write address of the processed transmission data in the DMAC register and reads the image information in the memory 82 in sequence, then sends the image information to the image processing section 84. At step S233, the image processing section 84 performs the processing described in the first and second embodiments and outputs the transmission data in the multilayer or 1-layer data format.

If the transmitting system 116 contains the configuration shown in the first embodiment of the image transmitting system of the invention, it determines whether the sent image information is a color or monochrome image and if the image information is a color image, prepares transmission data in the multilayer data format and stores the data in the memory 82. If the image information is a monochrome image, the transmitting system 116 prepares transmission data in the 1-layer data format and outputs the data.

When the transmitting system 116 contains the configuration shown in the second embodiment of the image transmitting system of the invention, if the received image information is a normal 1-layer color or monochrome image, the transmitting system 116 separates the received image information into three planes making up the multilayer data format and determines whether the received image information is a color or monochrome image and if the image information is a color image, prepares and outputs transmission data in the multilayer data format. If the image information is a monochrome image, the transmitting system 116 outputs only the selection data plane of the three planes as transmission data in the 1-layer data format. If the received image information is image information separated into the multilayer data format by the host computer 111–113, the transmitting system 116 prepares transmission data in the multilayer data format intact and outputs the data.

At step S284, the transmission data in the multilayer or 1-layer data format prepared at step S283 is stored in the memory 82 in sequence starting at the write address preset in the DMAC register. The memory 82 may be provided with a capacity capable of storing image data before conversion and image data after conversion or may be provided with a capacity for storing larger image data under dynamic control of write and read. At step S285, the transmission data in the multilayer or 1-layer data format stored in the memory 82 is stored in the image storage section 132 in sequence for saving.

Upon completion of storing the transmission data, control goes to step S286 at which the CPU 81 starts communication to the receiving party system previously specified. Detailed protocol will not be discussed here. At step S287, if it is determined that connection to the receiving party system is complete, control goes to step S288 at which the transmission data in the multilayer or 1-layer data format stored in the memory 82 is read in sequence and is transmitted to the receiving party system.

The described processing makes it possible to transmit the image information sent from the host computer 111–113 or the scanner 115 as the transmission data in the multilayer or 1-layer data format to the receiving party system. Alternatively, the transmission data stored in the memory 82 may be read in sequence and sent to the host computer 111–113 through the network control section 131. Thus, if the input image information is a color image, it is transmitted in the multilayer data format and can be transmitted with high efficiency with the image quality maintained. If the input image information is a monochrome image, it is transmitted in the normal 1-layer data format, whereby lowering of efficiency caused by transmitting in the multilayer data format can be prevented and highly efficient transmission as the former transmission can be executed.

In the receiving party system, the receiving system 126 reconstructs the image based on the fax image data received at the modem 127. If the sent data is in the multilayer data format, the receiving system 126 extracts the first image plane, second image plane and selection image plane compressed from the received data and decodes the planes, then adjusts the resolutions and selects and outputs the data of either the first or second image plane according to the data of the selection image plane, thereby reconstructing the image information.

The reconstructed image information undergoes image processing as required and can be stored intact or output from the printer 123 or 124 under the control of the client computer 121 or 122.

As seen from the description made so far, according to the invention, the transmission format is changed depending on whether the image information to be transmitted is a monochrome or color image, and when the image information is a color image, it can be transmitted in the multilayer data format where the input data is separated into multiple layers in response to the attribute. Thus, even an image with a mixture of a picture, photo image and a text, line drawing image can be transmitted with high image quality and moreover color image data can be transmitted with high efficiency. Monochrome images can also be transmitted with high efficiency as before.

What is claimed is:

1. An image transmitting system comprising:
    determination means for determining whether input image information is a color or monochrome image, and
    multilayer data format transmission means for transmitting the image information in a multilayer data format consisting of first image piece of data, second piece of image data, and selection data for selecting either the first or second piece of image data, wherein
        if said determination means determines that the image information is a color image, said multilayer data format transmission means transmits the image information in the multilayer data format.

2. The image transmitting system of claim 1, further comprising:
    inhibition means for inhibiting transmission of the image information in the multilayer data format, if said determination means determines that an image represented by the image information is a monochrome image.

3. The image transmitting system of claim 1, wherein said multilayer data format transmission means transmits the image information in any one of a transmission format of transmitting only the first or second piece of image data or only the selection data, a transmission format of transmitting the first piece of image data and the selection data, a transmission format of transmitting the second piece of image data and the selection data, and a transmission format of transmitting the first piece of image data, the second piece of image data, and the selection data.

4. The image transmitting system of claim 3, wherein if said determination means determines that the image information is a monochrome image, said multilayer data format transmission means transmits the image information in the transmission format of transmitting only the selection data.

5. An image transmitting system comprising:
    determination means for determining whether input image information is a color or monochrome image,
    multilayer data format transmission means for transmitting the image information in a multilayer data format consisting of first piece of image data, second piece of image data, and selection data for selecting either the first or second piece of image data,
    1-layer data format transmission means for transmitting the image information in a 1-layer data format consisting only of one data plane, and
    selection means for selecting said multilayer data format transmission means if said determination means determines that the image information is a color image, or selecting said 1-layer data format transmission means if said determination means determines that the image information is a monochrome image.

6. An image transmitting system comprising:
    multilayer data format transmission means for transmitting input image information in a multilayer data format consisting of first piece of image data, second piece of image data, and selection data for selecting either the first or second piece of image data, and
    image specification means for accepting of specification of color image transmission or monochrome image transmission, made by a user, wherein
        if color image transmission is specified on said image specification means, said multilayer data format transmission means transmits the image information in the multilayer data format.

7. The image transmitting system of claim 6, further comprising:
    inhibition means for inhibiting transmission of the image information in the multilayer data format if monochrome image transmission is specified on said image specification means.

8. The image transmitting system of claim 6, wherein said multilayer data format transmission means transmits the image information in any one of a transmission format of transmitting only the first or second piece of image data or only the selection data, a transmission format of transmitting the first piece of image data and the selection data, a transmission format of transmitting the second piece of image data and the selection data, and a transmission format of transmitting the first piece of image data, the second piece of image data, and the selection data.

9. The image transmitting system of claim 8, wherein if monochrome image transmission is specified on said image specification means, said multilayer data format transmission means transmits the image information in the transmission format of transmitting only the selection data.

10. An image transmitting system comprising:
    multilayer data format transmission means for transmitting input image information in a multilayer data format consisting of first piece of image data, second piece of image data, and selection data for selecting either the first or second piece of image data,
    1-layer data format transmission means for transmitting the image information in a 1-layer data format consisting only of one data plane,
    image specification means for accepting of specification of color image transmission or monochrome image transmission, made by a user, and
    selection means for selecting said multilayer data format transmission means if color image transmission is specified on said image specification means, or selecting said 1-layer data format transmission means if monochrome image transmission is specified on said image specification means.

11. The image transmitting system of claim 6, further comprising:
   determination means for determining whether the image information input at said input means is a monochrome or color image, wherein
      if said determination means determines that the image information is a monochrome image, said image specification means inhibits specification of color image transmission.

12. The image transmitting system of claim 10, further comprising:
   determination means for determining whether the image information input at said input means is a monochrome or color image, wherein
      if said determination means determines that the image information is a monochrome image, said image specification means inhibits specification of color image transmission.

13. The image transmitting system of claim 1, wherein
   said multilayer data format transmission means comprises image separation means for separating the image information into first piece of image data, second piece of image data, and selection data for selecting either the first or second piece of image data, separates the image information by the image separation means, and transmits in the multilayer data format.

14. The image transmitting system of claim 6, wherein
   said multilayer data format transmission means comprises image separation means for separating the image information into first piece of image data, second piece of image data, and selection data for selecting either the first or second piece of image data, separates the image information by the image separation means, and transmits in the multilayer data format.

15. The image transmitting system of claim 1, wherein
   the input image information is in a multilayer data format consisting of first piece of image data, second piece of image data, and selection data for selecting either the first or second piece of image data.

16. The image transmitting system of claim 6, wherein
   the input image information is in a multilayer data format consisting of first piece of image data, second piece of image data, and selection data for selecting either the first or second piece of image data.

17. An image transmitting method comprising the steps of:
   determining whether input image information is a color or monochrome image,
   transmitting the image information in a multilayer data format consisting of first piece of image data, second piece of image data, and selection data for selecting either the first or second piece of image data if the image information is determined a color image, and
   transmitting the image information in a 1-layer data format consisting only of one data plane if the image information is determined a monochrome image.

18. An image transmitting method comprising the steps of:
   accepting of specification of color image transmission or monochrome image transmission, made by a user,
   transmitting the image information in a multilayer data format consisting of first piece of image data, second piece of image data, and selection data for selecting either the first or second piece of image data if color image transmission is specified, and
   transmitting the image information in a 1-layer data format consisting only of one data plane if monochrome image transmission is specified.

19. The image transmitting method of claim 17, wherein
   if the image information is transmitted in the multilayer data format, the image information is transmitted in any one of a transmission format of transmitting only the first or second piece of image data or only the selection data, a transmission format of transmitting the first piece of image data and the selection data, a transmission format of transmitting the second piece of image data and the selection data, and a transmission format of transmitting the first piece of image data, the second piece of image data, and the selection data.

20. The image transmitting method of claim 18, wherein
   if the image information is transmitted in the multilayer data format, the image information is transmitted in any one of a transmission format of transmitting only the first or second piece of image data or only the selection data, a transmission format of transmitting the first piece of image data and the selection data, a transmission format of transmitting the second piece of image data and the selection data, and a transmission format of transmitting the first piece of image data, the second piece of image data, and the selection data.

* * * * *